United States Patent [19]
Takanashi et al.

[11] Patent Number: 5,150,226
[45] Date of Patent: Sep. 22, 1992

[54] METHOD AND APPARATUS FOR REPEATEDLY RECORDING OPTICAL IMAGE INFORMATION AND IMAGE PICKUP DEVICE

[75] Inventors: Itsuo Takanashi, Kamakura; Shintaro Nakagaki, Fujisawa; Tsutou Asakura, Yokohama; Masato Furuya, Yokosuka; Hirohiko Shinonaga, Yokohama; Hiromichi Tai, Yokosuka, all of Japan

[73] Assignee: Victor Company of Japan, Ltd., Yokohama, Japan

[21] Appl. No.: 369,226

[22] Filed: Jun. 21, 1989

[30] Foreign Application Priority Data

Jun. 21, 1988 [JP] Japan ............... 63-152556
Sep. 26, 1988 [JP] Japan ............... 63-240295
Nov. 3, 1988 [JP] Japan ............... 63-278229

[51] Int. Cl.⁵ .......... G02F 1/135; H04N 3/10; H04N 3/15; H04N 1/028
[52] U.S. Cl. .................. 358/471; 358/75; 358/909; 358/49; 358/55; 358/213.13; 358/225; 365/108; 365/112
[58] Field of Search ........... 358/41, 43, 44, 49, 358/55, 209, 213.13, 225, 471, 75, 909, 474; 395/72, 250, 252, 255; 365/108, 112

[56] References Cited

U.S. PATENT DOCUMENTS

| | | |
|---|---|---|
| 3,483,320 | 12/1969 | Gebel . |
| 3,922,204 | 11/1976 | Taylor . |
| 3,951,519 | 4/1976 | Schmidlin et al. . |
| 4,095,280 | 6/1978 | Okumura . |
| 4,333,124 | 6/1982 | Tamura . |
| 4,908,711 | 3/1990 | Majima ............... 358/474 |

FOREIGN PATENT DOCUMENTS

| | | |
|---|---|---|
| 0273773A2 | 12/1987 | European Pat. Off. . |
| 0273773A3 | 12/1987 | European Pat. Off. . |
| 0326347 | 1/1989 | European Pat. Off. . |
| 0327236 | 1/1989 | European Pat. Off. . |

Primary Examiner—Benjamin R. Fuller
Assistant Examiner—Scott A. Rogers
Attorney, Agent, or Firm—Fleit, Jacobson, Cohn, Price, Holman & Stern

[57] ABSTRACT

A image pickup device having a rewritable recording member on which optical patterns are repeatedly recorded as electrostatic images using a writing head with an electric potential applied between the head and recording member. Each image recorded on the recording member is erased prior to recording a subsequent image by application of an alternating voltage or an electric potential of opposite polarity between the writing head and recording member.

6 Claims, 27 Drawing Sheets

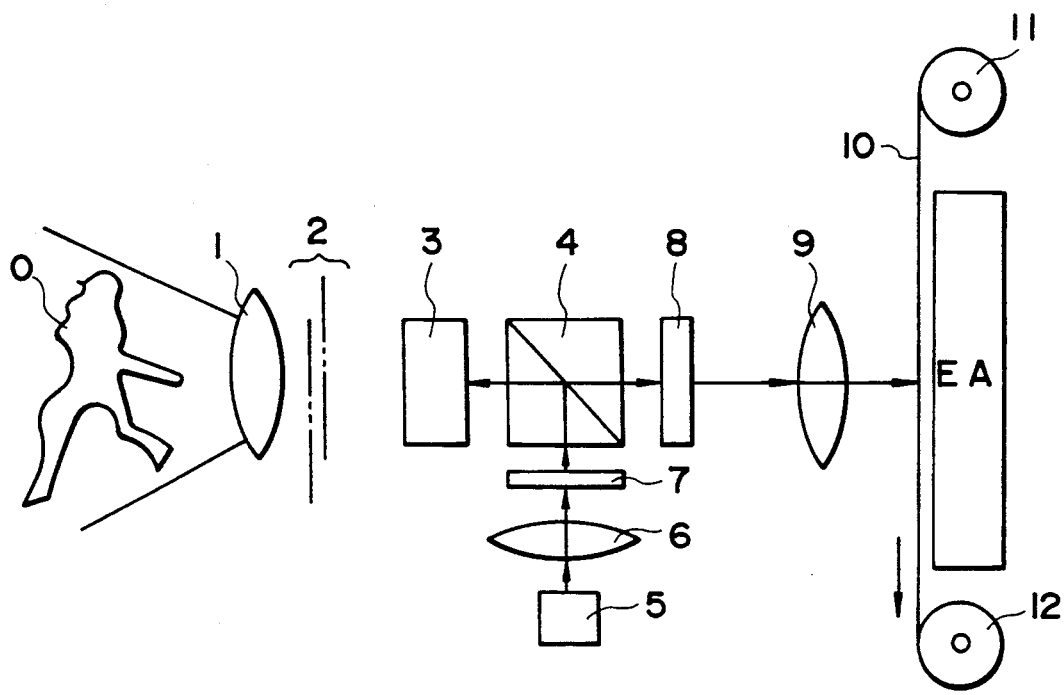
F I G. 7
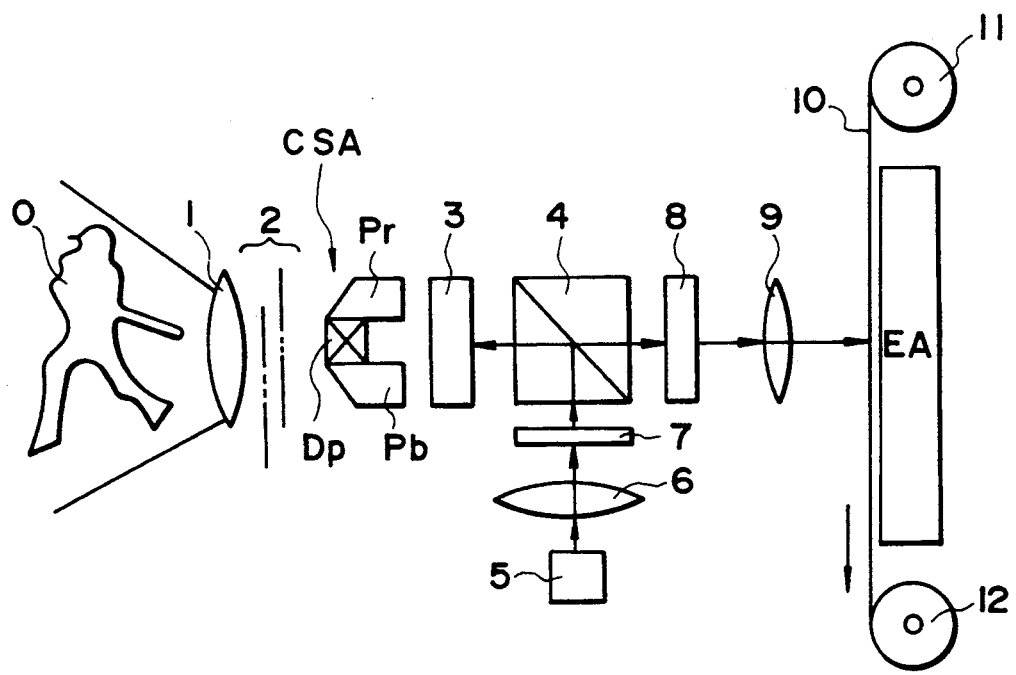
F I G. 8

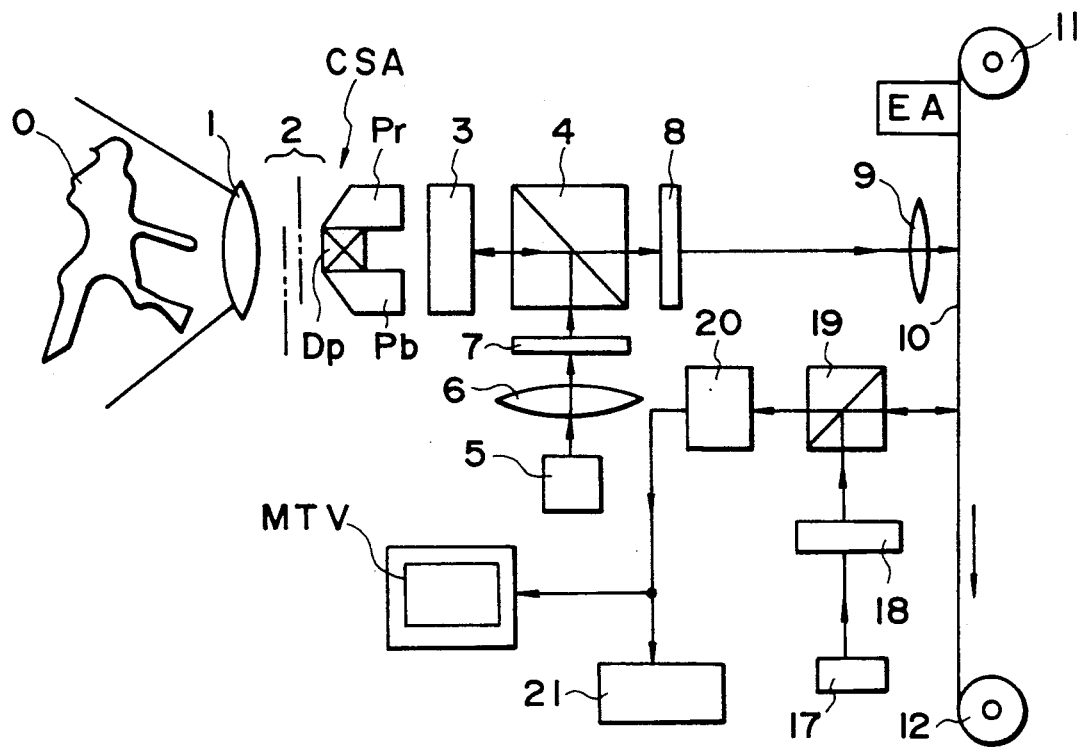
F I G. 11
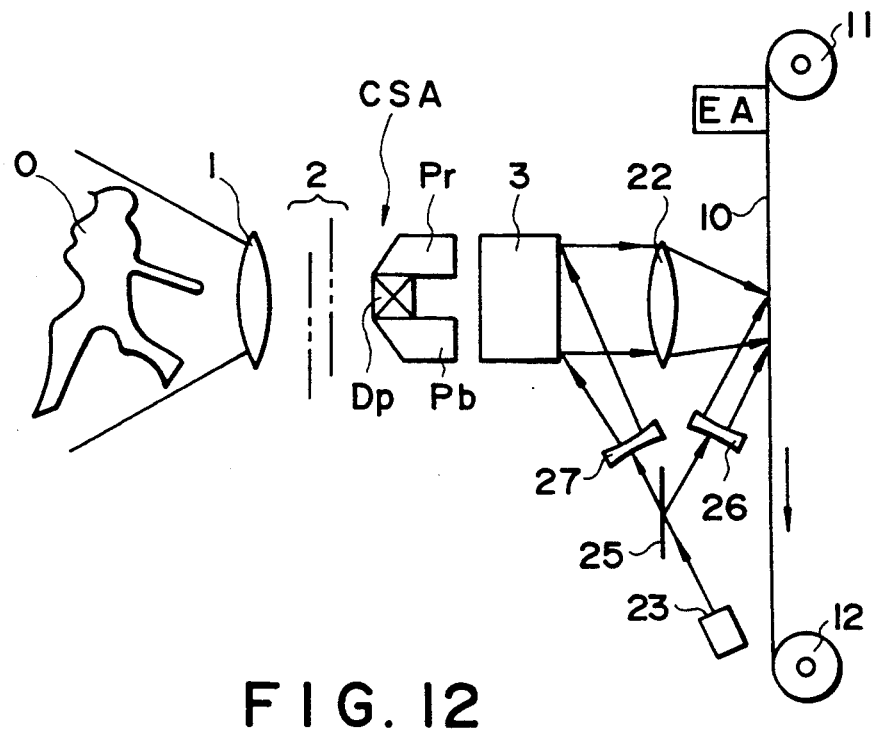
F I G. 12

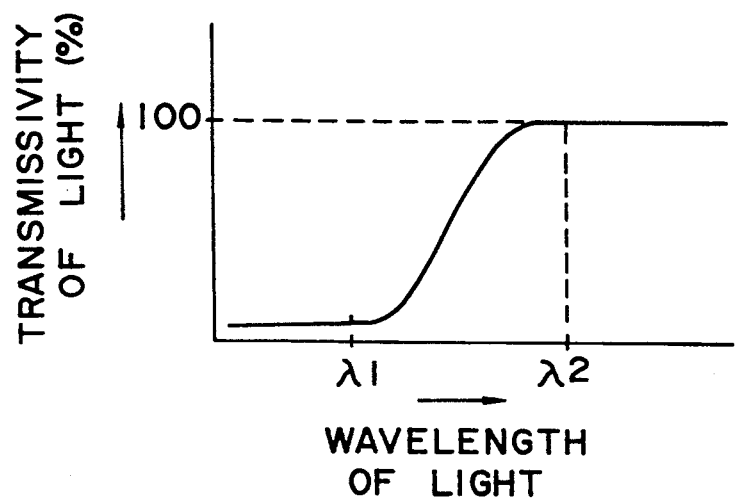
F I G. 15
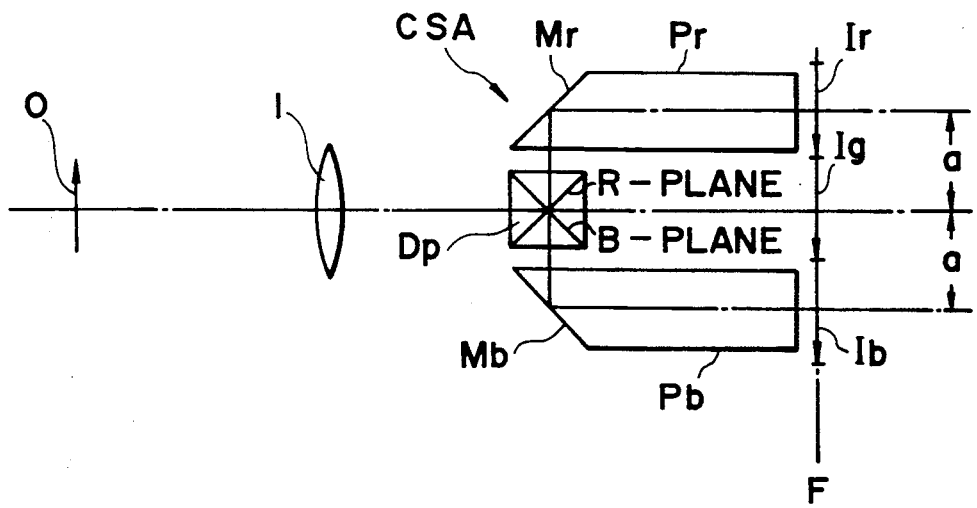
F I G. 16

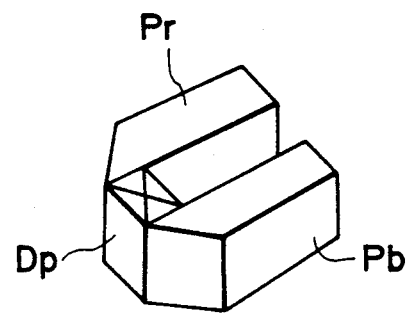
FIG. 17
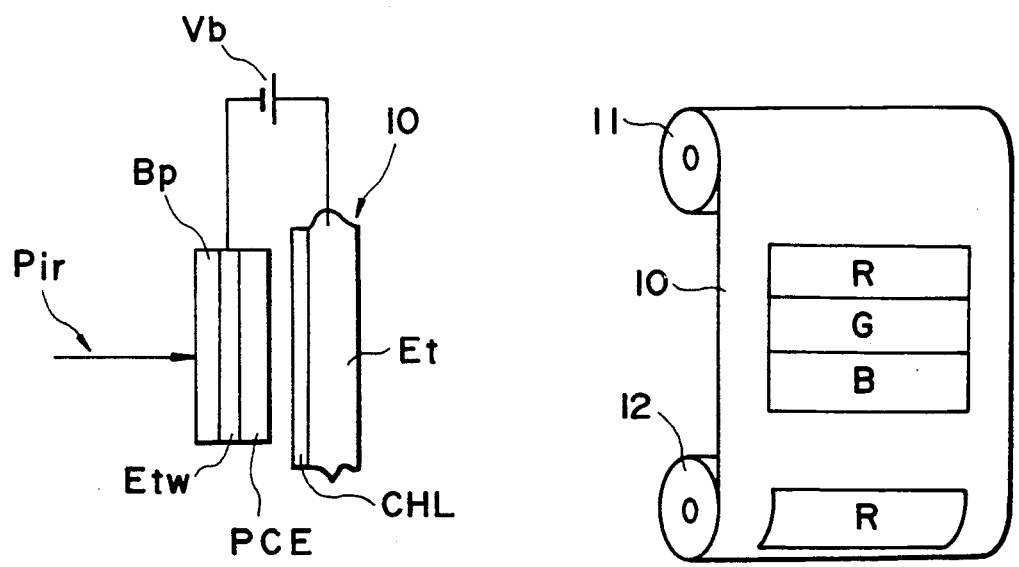
FIG. 18
FIG. 19

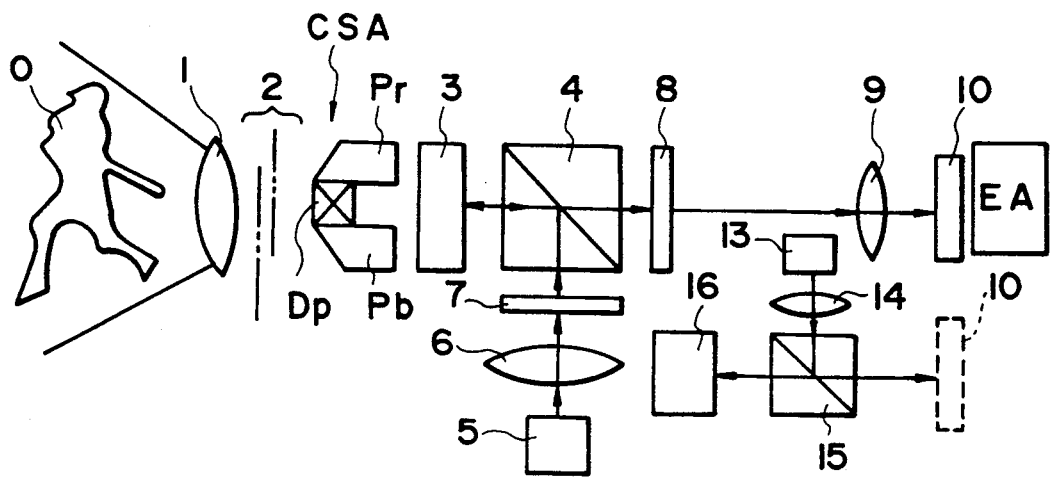
F I G. 29
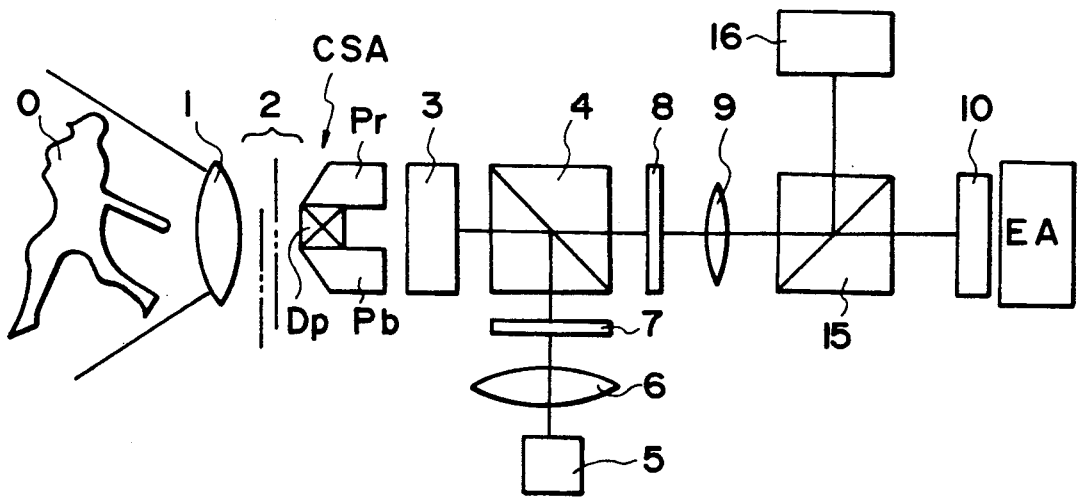
F I G. 30

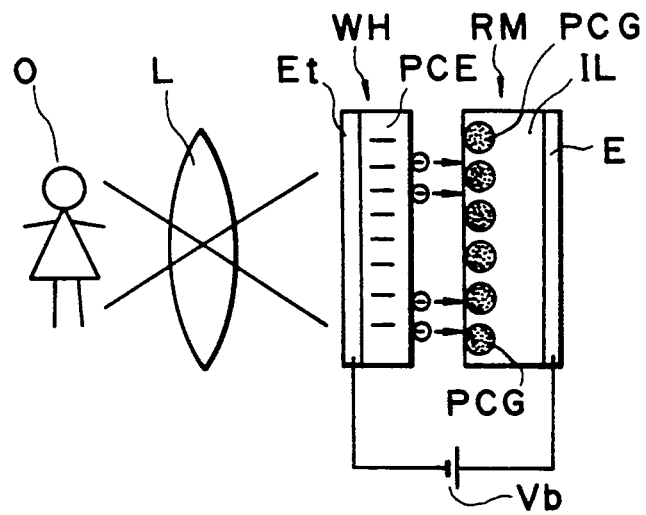
F I G. 50
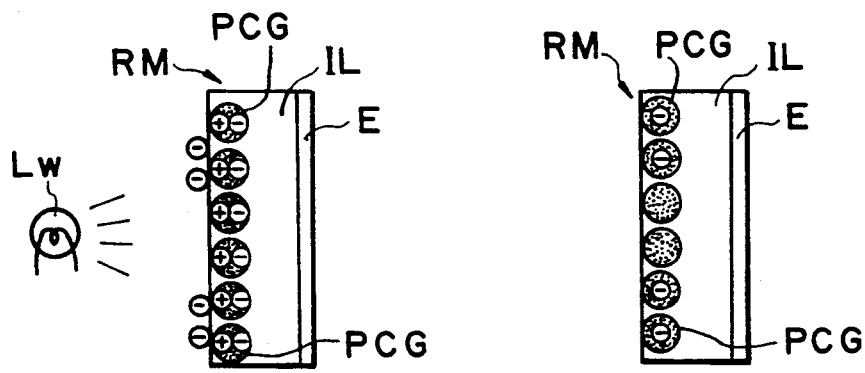
F I G. 51A  F I G. 51B
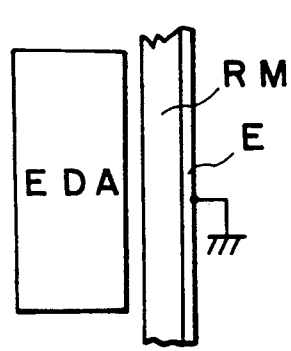  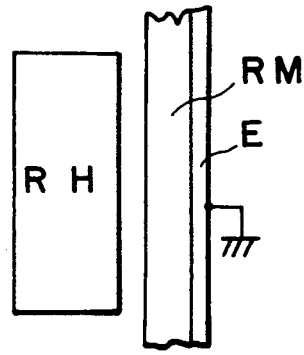
F I G. 52  F I G. 53

METHOD AND APPARATUS FOR REPEATEDLY RECORDING OPTICAL IMAGE INFORMATION AND IMAGE PICKUP DEVICE

BACKGROUND OF THE INVENTION

1. Industrial Applicability

This invention relates to a high resolution image pickup device, particularly an image pickup device having a high resolution, which is capable of recording and erasing optical image information utilizing a rewritable recording member.

2. Prior Art

Since a video signal either in a state of real time signal or stored signal obtained as a result of picking up electronically an image of an object has features of post-production conveniences i.e. editing and trimming of pictures, and other image signal processing are easy, and recording, erasing and reproduction of the video signal on and from conventional materials are quite feasible, such utilization thereof has been made in many fields, e.g., printing, electronic publishing and measurement fields, etc. in addition to the broadcasting field. However, in such applications, it has been strongly desired to develop a device capable of image pick up and recording of considerably high resolution pictures which may be optical image information charging time sequentially such as moving pictures, or still pictures.

In image pickup devices which have been typically used heretofore, an optical image of an object is formed on the photoelectric conversion section of the image pickup element by an imaging lens, and the optical image of the object is converted to electric image information in the image pickup element, thereafter to output the electric image information thus obtained as a continual video signal in the time domain. It is well known that various image pickup tubes and various solid state image pickup elements are used as an image pickup unit which is to be used in constituting the image pickup device.

3. Problems to be solved by the Invention

For obtaining a high picture quality and high resolution reproduced image, an image pickup device capable of producing a video signal corresponding thereto is required. In an image pickup device using an image pickup tube as the image pickup sensor, it is difficult to generate such a video signal capable of rendering a high picture quality and high resolution reproduced image because of the fact that there is a limitation in reduction of the diameter of the electron beam in the image pickup tube due to a performance limitation of the electron gun and the associated focus system structure, so that development of high resolution image pickup tube based on the reduction of the diameter of the electron beam cannot be expected. As an alternative, an increase of the target area of the image pickup tube is conceivable, but it requires a large optional system, and as a capacitance of the target of the image pickup tube increases in proportion to the target area, increase of the target area causes inevitably an attenuation of high frequency components in the output video signal. It should be noted that in the case of a high resulution image pickup device for a moving picture, the frequency range of the video signal would become more than several tens of MHz to several hundreds MHz, resulting in the problem of S/N ratio degradation, and the like.

Accordingly, it is unrealistic to develop the high resolution image pickup tube based on the reduction of the diameter of the electron beam or the increase of the target area.

Further, for providing a high picture quality and high resolution reproduced image by means of an image pickup device using solid state elements as the image pickup sensor, it is required to use a solid state image pickup element having a considerably large number of pixels. In the case of such a solid state image pickup element having a large number of pixels, the clock frequency for driving it would become extremely high (e.g., the clock frequency for driving the solid state image pickup element in the case of a moving picture camera becomes equal to several hundreds MHz), and the electrostatic capacitance of the circuit to be driven becomes large with an increase in the number of pixels, it is considered that such a solid state image pickup device cannot be constructed practically in the present circumstances where the limitation of the clock frequency of the solid state image pickup element is said to be 20 MHz.

As just described above, since conventional image pickup devices could not satisfactorily generate such a video signal capable of rendering high picture quality and high resolution reproduced image because of existence of image pickup sensors indispensable for the construction thereof, it is desired that an advent of image pickup device capable of satisfactorily generating such a video signal capable of rendering a high picture quality and high resolution reproduced image. Further, in many industries, e.g., printing, electronic publishing, measurement industries are expecting as their tool, electronic picture processing equipment utilizing video signals with which picture editing, trimming, and other image processing are easy, also recording/reproduction and recording/reproduction/erasing of an image having a high resolution are easily conducted using a recording member having an erasable and rerecordable property. It is also highly expected that an advent of image pickup device which can produce a recorded still or single picture having an extremely high a resolution.

For this purpose, there is proposed a charge image recording medium on which an electrostatic latent image corresponding to information to be recorded and reproduced is formed. In this type of the charge image recording medium, since the recorded image is on the exposed surface of the medium, the image is subject to deterioration, e.g. there is a preservation problem. For this reason, an attempt has been made to use a charge image recording medium such that an electrostatic latent image corresponding to information to recorded and reproduced is formed therewithin.

In order to use such an electric charge image recording medium repeatedbly as an erasable and rerecordable medium, there is desired means or method of erasing the recorded charge image formed even inside the recording medium. It has been needed that the above-mentioned recording medium can be repeatedly used as a reversible recording medium. For this reason, there has been required means for erasing an electrostatic latent image recorded in a charge image recording medium constituted so that an electrostatic latent image is formed in the electric.

SUMMARY OF THE INVENTION

An object of this invention is to provide an image picking up method and an image pickup device adapted to realize an image picking up and recording of a single pictorial image with resolution higher than those of conventional image pickup devices can produce.

Another object of this invention is to provide a method of erasing an electrostatic latent image recorded on or within the electric charge image recording medium so that the medium is repeatedly usable as a reversible, erasable and rerecordable recording medium.

To achieve the first-mentioned object, this invention provides a method of repeatedly recording optical image information, comprising forming an image of optical image information on a recording member having a reversible property, erasing the information recorded in the recording member prior to recording the optical image information into the recording member having reversible property, and repeatedly recording the optical image information; an image pickup device comprising means for forming an image of optical image information corresponding to an optical image of an object on a recording member having a reversible property by an imaging lens, means for recording the optical image information into the recording member having reversible property, and means for erasing the recording information recorded in the recording member having reversible property; an image pickup device comprising means for forming an image of optical image information corresponding to an optical image of an object, which is color-separated by a three color separation optical system, on a recording member having a reversible property by an imaging lens, means for recording the optical information which has been color-separated into a recording member having reversible property, and means for erasing the recording information recorded in the recording member having reversible property an image pickup device comprising means for forming, by an imaging lens an optical image of an object on a photo-to-photo conversion element, means for reprojecting, by light, optical image information corresponding to an optical image of the object which has been formed on the photo-to-photo conversion element onto a recording member having a reversible property, means for recording the optical image information into the recording member having reversible property, and means for erasing the recording information recorded in the recording member having reversible property; and an image pickup device comprising means including a three color separation optical system disposed between an imaging lens and a photo-to-photo conversion element to form an optical image of an object on the photo-to-photo conversion element by the imaging lens, means for reprojecting, by light, onto a recording member having a reversible property, optical information corresponding to the optical image of the object which has been formed on the photo-to-photo conversion element, means for recording the optical image information into the recording member having reversible property, and means for erasing the recording information recorded in the recording member having reversible property.

To achieve second-mentioned object, this invention provides a method of erasing an electrostatic latent image in a charge recording medium, the charge image recording medium being constructed as a charge image recording medium of a stacked structure comprising a charge transfer suppressive layer member and a dielectric layer member, in which information subject to recording and reproduction is recorded as an electrostatic latent image at the boundary portion between the charge transfer suppressive layer member and the dielectric layer member, or being constructed as a charge image recording medium comprising a dielectric layer member including therein a layer of fine particles of photoconductive material, in which information subject to recording and reproduction is recorded as an electrostatic latent image in the layer of fine particles of photoconductive material, wherein a voltage having an opposite polarity to that of the applied voltage used at the time of forming an electrostatic latent image is applied to the first or second mentioned charge image recording medium, an a.c. voltage is applied thereto, an alternating voltage having an amplitude gradually lowering with the lapse of time is applied thereto, and/or allowing the first or second mentioned charge image recording medium to be placed in a state where a voltage having a polarity opposite to that of the applied voltage used at the time of forming an electrostatic latent image, at the end of completion of erasing in applying an alternating voltage thereto to erase the electrostatic latent image, thus to erase the electrostatic latent image recorded in the charge image recording medium.

BRIEF DESCRIPTION OF THE DRAWINGS

FIGS. 1 to 12, and FIGS. 20 to 32 are block diagrams showing various examples of the arrangements of image pickup devices to which a method of repeatedly recording optical image information according to this invention is implemented, respectively;

FIG. 15 is a graphical representation of an example of the characteristic curve of a dielectric mirror;

FIG. 16 is a plan view of a three color separation optical system;

FIG. 17 is a perspective view of the three color separation optical system;

FIG. 18 is a view for explaining the recording principle of a charge image;

FIG. 19 is a perspective view showing how an optical image separated by the three color separation optical system is recorded;

FIGS. 48 to 51 are block diagrams showing several examples of the arrangements of recording systems for recording information subject to recording and reproduction using a charge image recording medium, respectively;

FIGS. 52 and 53 are block diagrams showing examples of the arrangements of reproducing systems for reproducing information recorded as an electrostatic latent image in the charge image recording medium, respectively;

DETAILED DESCRIPTION OF THE PREFERRED EMBODIMENTS

Repetitive recording for optical image information

Figure 1:
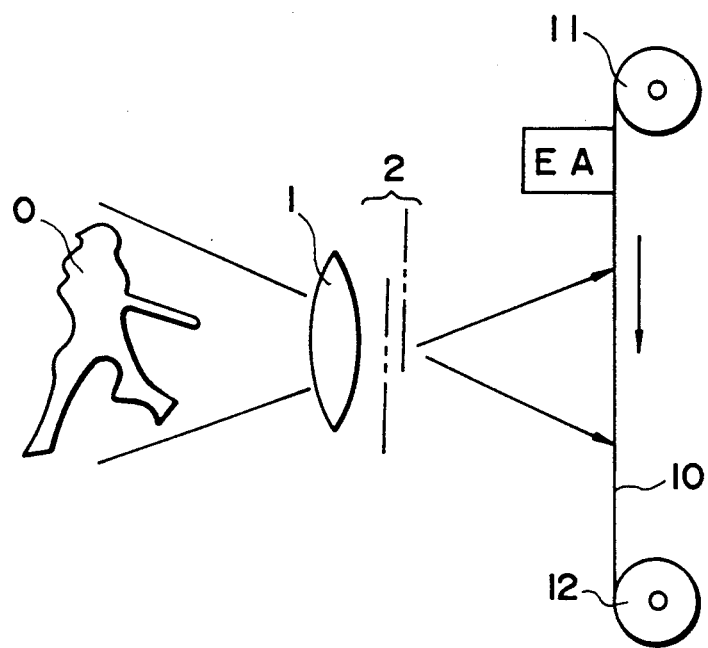

Embodiments of image pickup devices respectively shown in FIGS. 1 to 12 and FIGS. 20 to 24 represent an example of the arrangement in which a film like recording member wound onto reels 11 and 12 is used as a recording member having a reversible property which is at least optically sensitive (hereinafter simply referred to as a "recording member having a reversible property"). Further, embodiments respectively shown in FIGS. 25 to 32 represent an example of the arrangement in which a recording member for recording one pictorial image is used as a recording member having a reversible property. However, any recording member arbitrarily formed may be used as the recording member 10.

A member indicated by reference numeral EA in each of FIGS. 1 to 12 and FIGS. 20 to 32 is an erasing unit for erasing recording information which have been recorded on the recording member 10 prior to recording optical image of an object into the recording member 10 having reversible propoerty.

It is a matter of course that there should be used as the erasing unit EA an erasing unit constructed so as to have a function to permit recording signals recorded in respective recording member 10 to be satisfactorily erased appropriatee to the material of recording member 10 used in the image pickup devices. The method for erasing a charge image in the recording member 10 in the case where information signals are recorded into the recording member 10 in the form of an electrostatic charge form will be described later particularly with reference to FIG. 32 and those succeeding thereto.

The image pickup devices respectively shown in FIGS. 1 to 4 and FIGS. 9 to 12 represent an example of the arrangement in the case where the erasing operation carried out by the erasing device EA to the recording member 10 having reversible property is conducted at a position different from the position where the recording of the optical image information is carried out. Further, the image pickup devices respectively shown in FIGS. 5 to 8 and FIGS. 20 to 32 represent an example of the arrangement in the case where the erasing operation carried out by the erasing unit EA to the recording member 10 having reversible property is conducted at the same location where recording of the optical image information is carried out.

Figure 2:
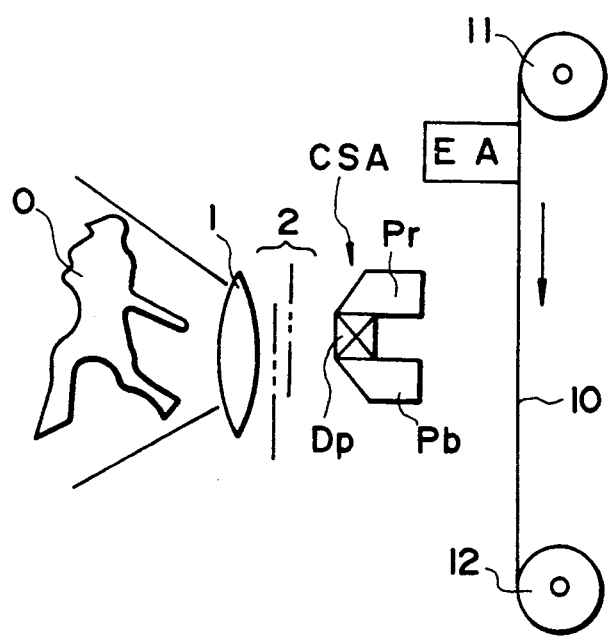
Figure 3:
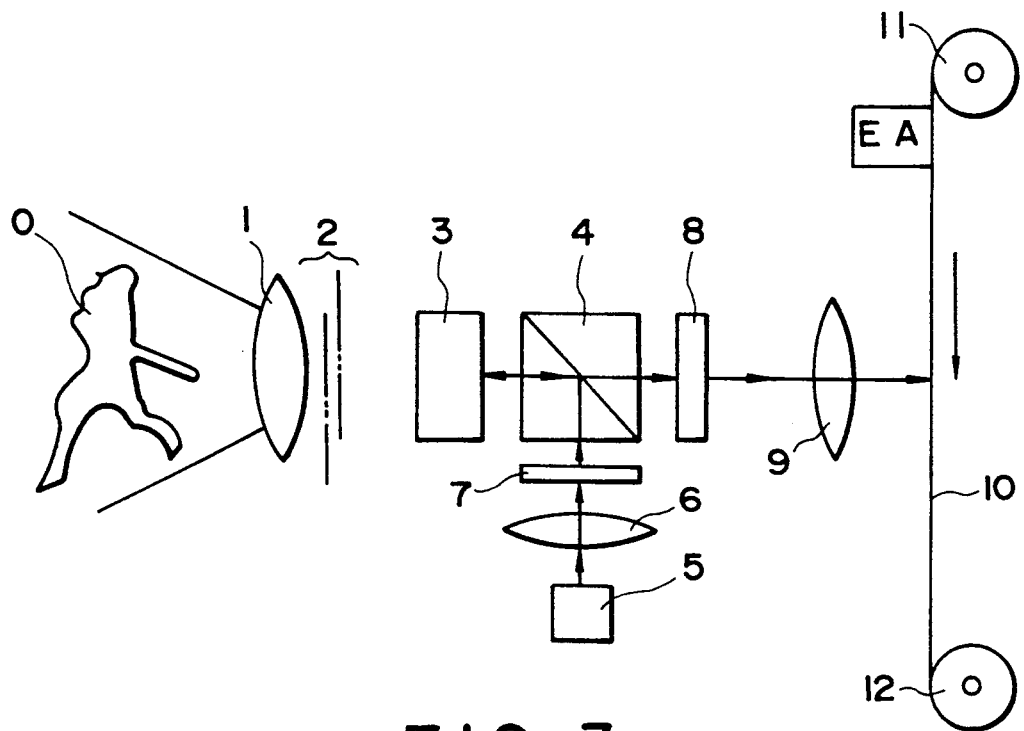
Figure 4:
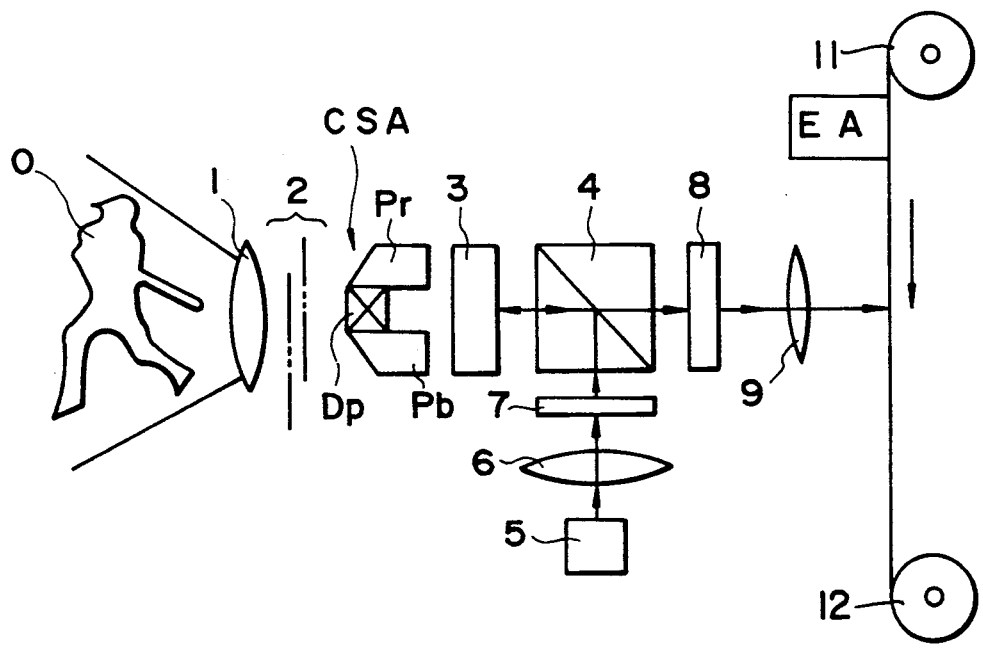
Figure 5:
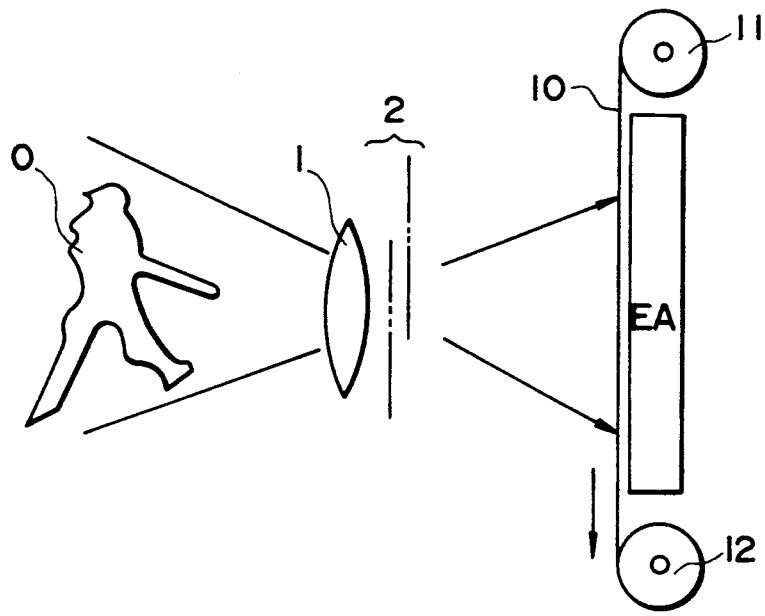
Figure 6:
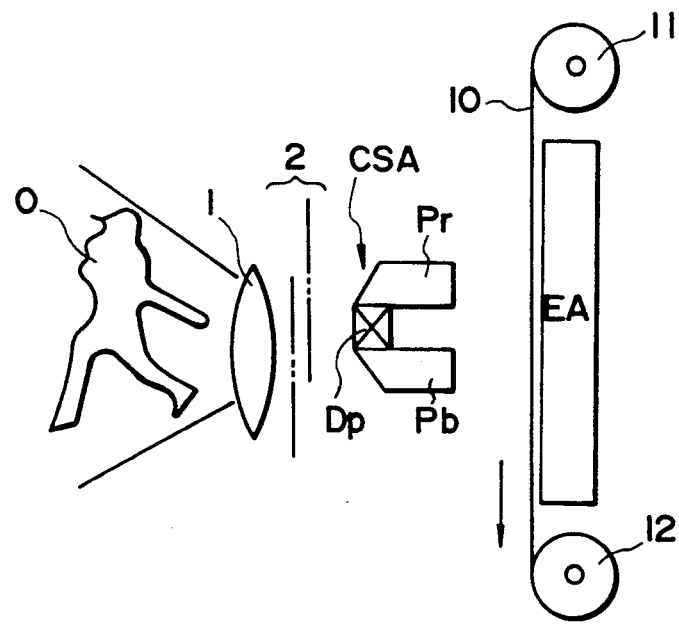
Figure 24:
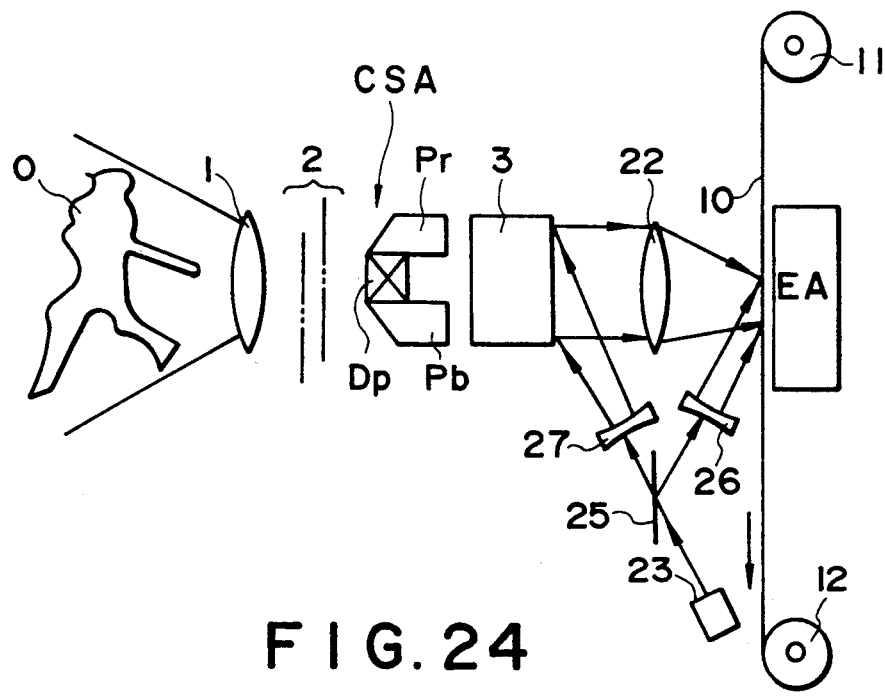
Figure 25:
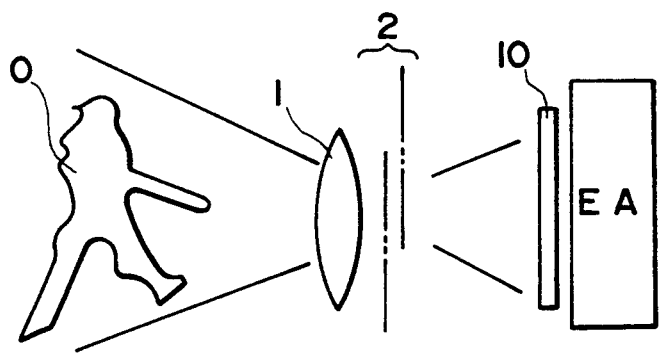
Figure 26:
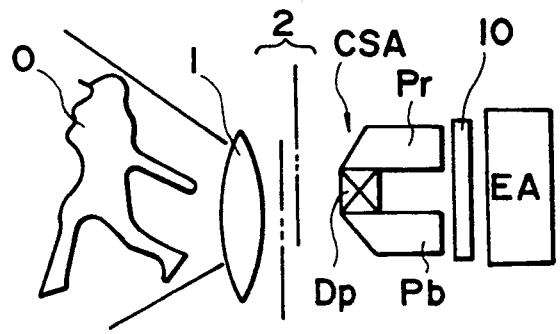
Figure 27:
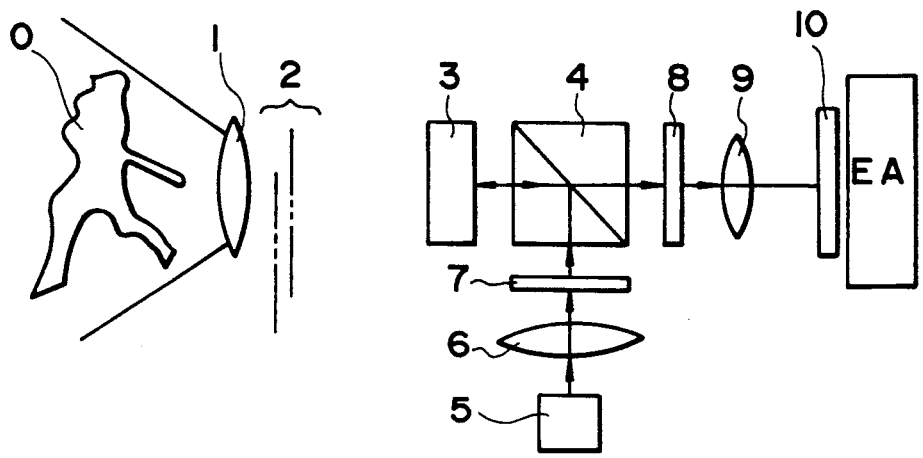

The image pickup devices respectively shown in FIGS. 1, 5 and 25 represent an embodiment in the case where an optical image of the object 0 is formed on the recording member 10 by the imaging lens 1, i.e., an example of the arrangement of an image pickup device comprising means for forming an image of optical image information corresponding to an optical image of the object on a recording member having a reversible property by the imaging lens, means for recording the optical image information in the recording member having reversible property, and means for erasing the recording information recorded in the recording member having reversible property. Further, the image pickup devices respectively shown in FIGS. 2, 6 and 26 represent an embodiment in the case where a plurality of optical images obtained by color-separating an optical image of the object 0 by the three color separation optical system CSA are formed on the recording member 10, i.e., an example of the arrangement of an image pickup device comprising means for forming an image of optical image information corresponding to an optical image of the object 0, which is color-separated by the three color separation optical system CSA, by the imaging lens 1 on the recording member 10 having reversible property, means for recording the optical image information color-separated in the recording member 10 having reversible property, and means for erasing the recording information recorded in the recording member 10 having reversible property. Furthermore, the image pickup devices respectively shown in FIGS. 3, 7 and 27 represent an example of the arrangement of an image pickup device comprising means for forming an optical image of the object 0 on a photo-to-photo conversion element 3 by the imaging lens 1, means for reprojecting by light optical image information corresponding to the optical image of the object formed on the photo-to-photo conversion element 3, means for recording the optical image information in the recording member 10 having reversible property, and means for erasing the recording information recorded in the recording member 10 having reversible property. In addition, the image pickup devices respectively shown in FIG. 4, FIGS. 8 to 12, FIGS. 20 to 24, and FIGS. 28 to 32 represent an example of the arrangement of an image pickup device comprising means including a three color separation optical system CSA disposed between imaging lens 1 and photo-to-photo conversion element 3 to form an optical image of an object 0 on the photo-to-photo conversion element 3 by the imaging lens 1, means for reprojecting, by light, optical image information corresponding to the optical image of the object 0 formed on the photo-to-photo conversion element 3, means for recording the optical image information having reversible property, and means for erasing the recording information recorded in the recording member 10 having reversible property.

In the respective embodiments of the image pickup devices, where a film like recording member is used as the recording member 10 having reversible property, the recording member 10 is moved by a drive mechanism (not shown) from a feed out reel 11 to a take-up reel 12 in a predetermined transfer arrangement. Namely, in the case where the image pickup device is operating in the operating mode as a shutter camera, the recording member 10 is transferred by a distance corresponding to one frame (corresponding to one pictorial image) after the optical shutter 2 is opened over a predetermined time period and is then closed. Further, in the case where the image pickup device is operating in the operating mode as a moving picture camera, intermittent feeding is carried out such that the recording member 10 is rapidly transfered frame by frame at a pitch corresponding to one picture frame (corresponding to one pictorial image) with the recording member being momentarily stopped over a predetermined time period for recordably one pictorial image. It is to be noted that a mechanism similar to the well known transfer mechanism in a movie camera may be employed as the intermittent transfer mechanism for the recording member 10.

For the recording member having reversible property, any recording member having rewritable capability, such as, for example, a photochromic material, a thermoplastic film, a magneto-optical material, and the like may be used. In addition, a recording member having photoelectric conversion capability may be used so that an optical image incident to the recording member 10 having reversible property is recorded as a charge image. As an actual configuration thereof, a recording member virtually having the same characteristics as the photo-to-photo conversion element described later with reference to FIGS. 13 to 15, or a recording member of which construction will be described with reference to FIG. 18 may be utilized.

The recording member 10 may be a form of disk, sheet, tape, or of any other form or configuration.

The actual arrangement of the three color separation optical system CSA indicated by CSA in various figures showing the embodiments of image pickup devices will be described with reference to FIGS. 16 and 17, and the actual arrangement of the photo-to-photo conversion element indicated by reference numeral 3 in various figures showing embodiments of image pickup devices will be described with reference to FIGS. 13 to 15.

The perspective view of the entirety of the three color separation optical system CSA is illustrated in FIG. 17, and the plan view for explaining the principle construction thereof is illustrated in FIG. 16. In FIGS. 16 and 17, Dp denotes a dichroic mirror in the form of prism (dichroic prism Dp) of a structure such that a dichroic mirror (R-plane) from which a red light is reflected and through which green light and blue light are passed and a dichroic mirror (B-plane) from which blue light is reflected and through which green light and red light are passed are arranged perpendicular to each other. Moreover, Pr and Pb denote a prism having a total reflection surface Mr and a prism having a total reflection surface Mb, respectively.

In the arrangement shown in FIG. 16, when a light from the object 0 is incident to the dichroic prism Dp through the imaging lens 1, the green light component of an optical image of the object which have been passed through both the dichroic mirror (R-plane) and the dichroic mirror (B-plane) forms a green image on an image formation plane Ig, the red light component of an optical image of the object reflected on the dichroic mirror R-plane is further reflected on the total reflection surface Mr of the prism Pr and is then passed through the prism Pr to form a red image on an image formation plane Ig which is aligned with and adjacent to the image formation plane Ig, and the blue light component of an optical image of the object reflected on the dichroic mirror B-plane is further reflected on the total reflection surface Mb and is then passed through the prism Pb to form a blue image on an image formation plane Ib which is aligned with the above-mentioned image formation planes Ig and Ir and is adjacent to the plane Ig.

These three image formation planes Ig, Ir and Ib are formed within the same plane as previously described and are closely positioned each other. In the three color separation optical system CSA shown in FIGS. 16 and 17, the prism Pr serves to lengthen or extend the optical path length of the red light and the prism Pb serves to lengthen the optical path length of the blue light, causing the focal length of the lens 1 for the red and blue light to extend.

As a result, all the green, red and blue images are accurately focused on the single plane which includes the image formation planes Ig, Ir and Ib, and arranged linearly in contiguity with each other. An extended amount X of the optical path length by each of the prism Pr and Pb is set to an offset of the optical axes of the red and blue lights from the one of the green light, so that X=a holds.

Assuming that the optical path length per se in the prisms Pr and Pb is d, and the refractive index of the constituent material of the prisms Pr and Pb is n, the extended amount X of the optical path length by each of the prisms Pr and Pb is expressed as $X=d(n-1)/n$. Thus, a compensation for the offset of the optical axes can be performed by adjusting the optical path length d in the prisms Pr and Pb and the refractive index n of the constituent material of the prisms Pr and Pb.

When there is employed a color separation optical system adapted so that optical images of an object separated into primary colors are formed on the three image formation planes Ir, Ig and Ib formed linearly in contiguity with each other as in the three color separation optical system CSA as constituted above, high resolution three color pictorial images can be recorded and reproduced in parallel at a time by disposing a recording member having a reversible property at the above-mentioned plural image information planes which one aligned with on a single plane.

The photo-to-photo conversion element will be now described with reference to FIGS. 13 to 15. For the photo-to-photo conversion element 3, e.g., a liquid crystal optical modulator, an photo-conductive Pockels effect element, a Kerr effect element, a microchannel spatial light modulator, an element constituted by using a photochromic material, and the like may be used. For such a photo-to-photo conversion element 3, or as having a storage function and ones having no storage function may be selectively used according to the purpose.

Figure 13:
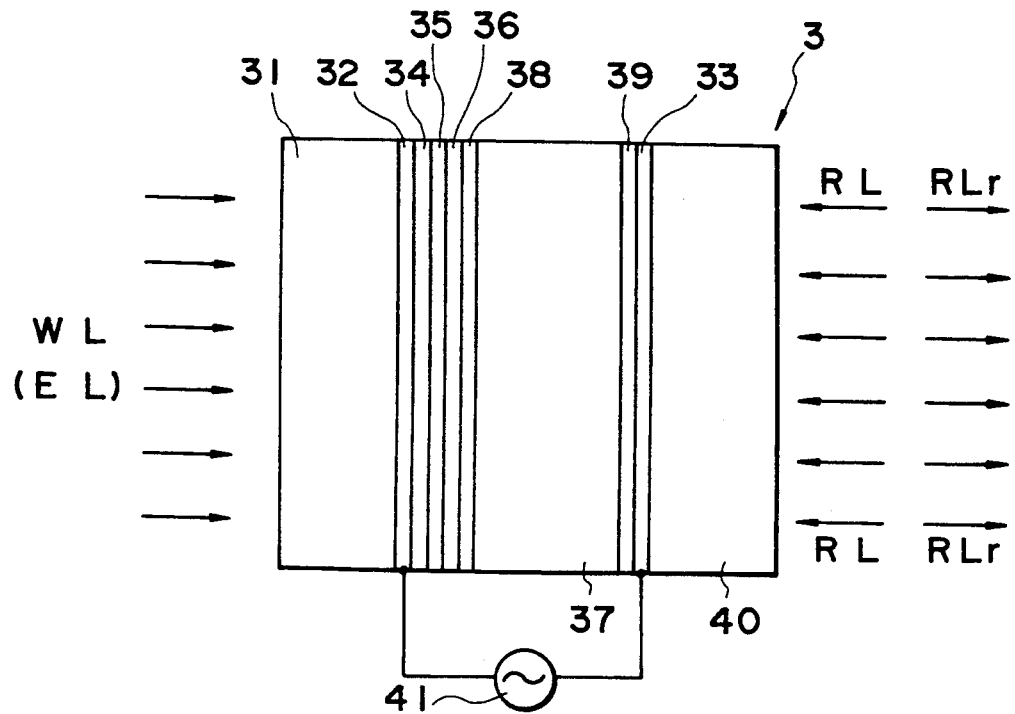
FIGS. 13 and 14 are side cross sectional views showing various examples of the arrangements of photo-to-photo conversion elements, respectively.

FIG. 13 is a side cross sectional view showing an example of the arrangement of the liquid crystal optical modulator which can be used as the photo-to-photo conversion element 3. The liquid crystal optical modulator 3 shown in FIG. 13 includes a glass plate 31, transparent conductive electrodes 32 and 33, a photoconductive film 34, a light shielding layer, a dielectric mirror 36, a nematic liquid crystal layer 37, liquid crystal orientation films 38 and 39 between which the nematic liquid crystal layer 37 is interposed so as to provide a twisted orientation such that the optical axis of the molecule of the nematic liquid crystal becomes parallel to the electrode plates as an initial condition, and the polarization of the passing light thereto is modulated in response to the electrical field applied to a body of the liquid crystal, due to the twist nematic effect thereof. Between the transparent electrodes 32 and 33, an a.c. power supply 41 is provided. In this figure, WL and RL are a writing light and a reading light, respectively.

When an optical image of an object incident to the liquid crystal optical modulator 3 shown in FIG. 3 is transmitted through the glass plate 31 and the transparent conductive electrode 32 and is then formed on the photoconductive film 34, the electric resistance value of the photoconductive film 34 varies in correspondence with the intensity distribution of the optical image of the object formed on the photoconductive film 34. The light shielding layer 35 is provided so that the electric resistance value of the photoconductive film 34 may not be changed by the reading light RL.

A body the nematic liquid crystal layer 37 to which an electric field corresponding to the optical image of the object is applied through the photoconductive film 34, the light shielding layer 35, the dielectric mirror 36, and the liquid crystal orientation film 38 undergoes a change as such that the polarization of the passing light thereto is varied correspondingly with the applied electric field. Thus, when the reading light RL is projected toward the optical glass substrate 40 of the liquid crystal optical modulator 3, a reflected light RLr of the reading light RL undergoes the double refraction effect caused in the nematic liquid crystal layer 37, so that the optical image being polarization modulated appears on the optical glass substrate 40 side.

Figure 14:
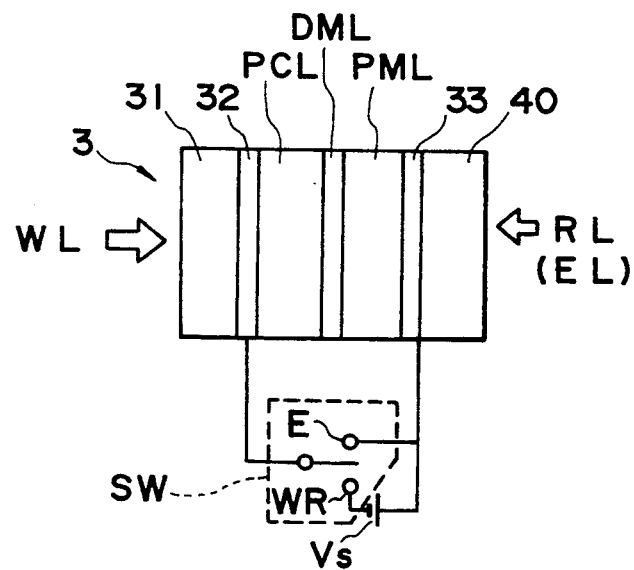

FIG. 14 shows an example of the arrangement of the photo-to-photo conversion element 3 of a structure different from that of the photo-to-photo conversion element 3 which has been already described with reference to FIG. 13. In FIG. 14, reference numerals 32 and 33 denote transparent electrodes, respectively. These electrodes are provided between the optical glass substrates 31 and 40, respectively. Further, referring to FIG. 14, PCL and DML denote a photoconductive layer and a dielectric mirror, respectively, PML denotes an optical member adapted to modulate the polarization of light in response to an intensity distribution of an electric field applied thereto {e.g., an optical modulation layer such as a lithium niobate single crystal or bismuth silicate (BSO) . . . an example where the optical modulation layer is constituted by using lithium niobate single crystal will be described below}. In addition, WL, RL and EL denote a writing light a reading light, and an erasing light, respectively.

The reason why the incident direction of the erasing light EL is the same as the incident direction of the reading light RL in FIG. 14 is that a photo-to-photo conversion element having such a transmittance characteristic to reflect a reading light RL having a wavelength λ1 and to pass an erasing light EL having a wavelength λ2 as illustrated in FIG. 15 is used as the photo-to-photo conversion element 3 shown in FIG. 14.

In the case of writing optical information into the photo-to-photo conversion element 3 shown in FIG. 14, a procedure is preferably taken to connect a circuit consisting of a power source Vs and a changeover switch SW to the photo-to-photo conversion element 3 to deliver a switching control signal to the changeover switch SW to switch the movable contact of the changeover switch SW to the fixed contact WR side to apply a voltage of the power source Vs across the transparent electrodes 32 and 33, thus placing the photoconductive layer PCL in the state where an electric field is applied across the both ends thereof. Thus, writing of optical information into the photo-to-photo conversion element 3 is conducted by allowing a writing light WL to be incident from the transparent electrode 32 side of the photo-to-photo conversion element 3.

Namely, when the writing light WL incident to the photo-to-photo conversion element 3 is passed through the transparent electrode 32 to reach the photoconductive layer PCL as stated above, the electric resistance value of the photoconductive layer PCL vary in correspondence with an intensity distribution of the optical image by the incident light which reaches the photoconductive layer PCL. Thus, a charge image corresponding to the optical image by the incident light which has reaches the photoconductive layer PCL is produced at the boundary surface between the photoconductive layer PCL and the dielectric mirror DML.

In the case of progressively reading the optical information in the form of a charge image which is still being written progressively in to the photo-to-photo conversion element 3, a procedure is preferably taken to switch the movable contact of the changeover switch SW to the fixed contact WR side to apply a voltage of the power source Vs across the transparent electrodes 32 and 33, under this conditions a reading light RL having a fixed light intensity from a light source (not shown) is projected to the transparent electrode 33 side of the photo-to-photo element 3. Accordingly, a simultaneous writing and reading operation, in which the reading is closely following the writing with a slight delay, is performed.

Namely, at the boundary surface between the photoconductive layer PCL and the dielectric mirror DML, a charge image having an intensity distribution corresponding to the optical image by the incident light which has reached the photoconductive layer PCL is formed. The optical member PML (e.g., lithium niobate single crystal PML) provided along the light path and the subsequent to the photoconductive layer PCL dielectric mirror DML is placed in the state where an electric field from the charge image produced in correspondence with the optical image by the incident light is applied thereto.

Since the refractive index of the lithium niobate single crystal changes in response to an electric field by the linear electrooptical effect, the refractive index of the lithium niobate single crystal PML provided in the photo-to-photo conversion element 3 is modulated correspondingly with the dimensional distribution of the electric field of the charge image formed on the boundary surface between the photoconductive layer PCL and the dielectric mirror DML, following to the progressive writing of the optical information by the incident light as previously described.

In the case where reading light RL is projected onto the optical glass substrate 40 on the transparent electrode 33 side, the reading light RL thus projected travels through a route including optical glass substrate 40, transparent electrode 33, lithium niobate single crystal PML, and dielectric mirror DML. The reading light RL is then reflected by the dielectric mirror DML, and comes back toward the optical glass substrate 40 on the transparent electrode 33 side as a reflected light. Since the refractive index of the lithium niobate crystal PML varies depending upon an applied electric field by the linear electrooptical effect, the reflected light of the reading light RL is modulated with the image information corresponding to the intensity distribution of an electric field applied to the lithium niobate single crystal PML. Thus, an optical image corresponding to the optical image by the incident light is regenerated and outputted to the optical glass substrate 40 through the transparent electrode 33.

Further, in the case of erasing information written by the writing light WL as stated above, a procedure is preferably taken to deliver a switching control signal to the changeover switch SW to switch the movable contact of the changeover switch SW to the fixed contact E side to place the photo-to-photo conversion element 3 in the state where no electric field is applied across the transparent electrodes 32 and 33, thereafter an erasing light EL having a uniform intensity distribution is projected from the transparent electrode 33 side.

The photo-to-photo conversion element which has been described with reference to FIGS. 13 and 14 has a function of storing an optical image information of the object formed by an imaging lens, in the form of a charge image, and a function of reproducing the charge image thus stored as optical image information, and a function of erasing the stored information.

Thus, it is apparent that a recording member of the same structure as that of the photo-to-photo conversion element 3 which has been described with reference to FIGS. 13 and 14 may be used as the recording member 10 having a reversible property, which is used in a method for repeatedly recording optical image information and used for an image pickup device according to this invention.

An actual example of the configuration of a recording member having a reversible property in another form and capable of recording an optical image as a charge image will be described with reference to FIG. 18.

In FIG. 18, PLr denotes a light including optical image information to be recorded. This light PLr is incident to a record head which consists of a glass substrate BP, a transparent electrode Etw and a photoconductive layer material PCE, and functions as an optical image-to-charge image conversion unit. Under the condition where recording operation is performed, the end surface of the recording head, i.e., the end surface of the photoconductive layer member PCE and a charge hold layer CHL in the recording member 10 are tightly in contact with each other, or are opposes to each other with a very small distance therebetween. The recording member 10 is constituted by the charge hold layer CHL backed by of an electrode Et serving as a substrate plate and a layer of an insulating material (e.g., high molecular material). In recording, a voltage source Vb is connected between the both electrodes Et and Etw so that an electric field is applied across the electrode Et of the recording member 10 and the electrode Etw in the recording head.

At the time of the recording operation, a light PLr forms an image on the photoconductive layer member PCE in the record head of a stacked structure comprising a glass substrate BP, a transparent electrode Etw, and a photoconductive layer material PCE. Since a constant voltage is applied from the power source Vb, as described above, across the electrode Etw in the recording head and the electrode Et in the recording member 10, the electric resistance of the photoconductive layer member PCE is modulated in correspondence with the intensity distribution of the formed image thereon.

Thus, a charge image pattern corresponding to the optical image incident to the recording head appears on the end surface of the recording head, i.e., the end surface of the photoconductive layer member PCE. As a result, a charge image of one pictorial image corresponding to an optical image incident to the recording head is formed on the charge hold layer CHL in the recording member, in the manner disclosed in the European patent application No. 89300633.8 filed by the applicant of the present invention. It is to be noted that it is of course that a charge recorded in the recording member 10 can be easily erased, thus the recording member of the structure shown in FIG. 18 can be used as a recording member having a reversible property.

It is further to be noted that as the recording member for the charge image, the photochromic material, the thermoplastic film, the magnetooptical material, or the like is used as the recording member 10 having reversible property, erasing of the recording member 10 should be carried out with an eraser EA having a structure and functions suitable for the type of the recording member 10 just mentioned.

In the image pickup devices respectively shown in FIGS. 1, 5 and 25, an optical image of the object 0 is formed on the recording member 10 having reversible property by the imaging lens 1. Thus, optical image information corresponding to the optical image of the object is recorded into the recording member having reversible property. In the arrangment shown in FIG. 1 the erasing operation by the eraser EA to the recording member 10 having reversible property is conducted at a position ahead of the recording position with respect to the travel direction of the recording member 10. Further, in the image pickup devices respectively shown in FIGS. 5 and 25, the erasing operation by the erasing unit EA is conducted at the same position as the position where optical image information of the object is recorded.

It is to be noted that it is of course that the erasing operation to the recording member 10 may be performed before the recording member 10 is located to the image pickup device (This applies to all the embodiments).

The image pickup devices respectively shown in FIGS. 2, 6 and 26 represent an embodiment of the image pickup device constituted so that a plurality of optical images obtained as a result of color-separation of an optical image of the object 0 by the three color separation optical system, are formed together on the recording member 10 by the imaging lens 1. In the image pickup device shown in FIG. 2, the erasing operation by the erasing unit EA to the recording member having reversible property is conducted at a position ahead of the recording position. Further, in the image pickup devices respectively shown in FIGS. 6 and 26, the erasing operation by the erasing unit EA to the recording member 10 having reversible property is carried out at the same position where the optical image information of the object 0 is to be recorded.

How a polurality of optical images color-separated by the three color separation optical system are focused together on the recording member 10 by means of the imaging lens 1 will be apparent by making reference to the example shown in FIG. 19 where a roll film is used as the recording member.

The image pickup devices respectively shown in FIGS. 3, 7 and 27 are an image pickup device adapted to focus an optical image of the object 0 on the photo-to-photo conversion element 3 by means of the imaging lens 1, and the resultant, optical image stored in the photo-to-photo conversion element 3 is read out and projected by light through lens 9 to the recording member 10 having reversible property to record the image information onto the recording member 10 having reversible propoerty. In the image pickup device shown in FIG. 3, the erasing operation by the erasing unit EA to the recording member having reversible property is conducted at a position ahead of the position at which optical image information of the object is recorded. Further, in the image pickup devices respectively shown in FIGS. 7 and 27, the erasing operation by the erasing unit EA to the recording member 10 having reversible property is carried out at the same position as the position where the optical image information of the object 0 is recorded.

Image pickup devices respectively shown in FIG. 4, FIGS. 8 to 12, FIGS. 20 to 24, and FIGS. 28 to 32 are an image pickup device adapted to dispose the three color separation optical system CSA between the imaging lens 1 and the photo-to-photo conversion element 3 to form a plurality of optical images together which are obtained as a result of the color-separation on the photo-to-photo conversion element 3, the resultant three optical images having different colors each other and stored in projected the photo-to-photo conversion element 3 is read out and projected by light to the recording member 10 having reversible property. In the image pickup devices respectively shown in FIG. 4 and FIGS. 9 to 12, the erasing operation by the erasing unit EA to the recording member having reversible property at a position ahead of the position where optical image information of the object 0 is recorded. Further, in image pickup devices respectively shown in FIG. 8, FIGS. 20 to 24, and FIGS. 28 to 32, the erasing operation by the erasing unit EA to the recording member 10 having reversible property is conducted at the same position as the position where optical image information of the object 0 is to be recorded.

The image pickup device of a structure provided with three color separation optical system CSA between imaging lens 1 and photo-to-photo conversion element 3 included in the embodiments respectively shown in FIGS. 3, 4 and 7, FIGS. 8 to 12, FIGS. 20 to 24, and FIGS. 27 to 32, as a constituent member will be described in more detail.

In FIG. 4, 0 represents an object, and the arrangement shown in this figure includes an imaging lens 1, an optical shutter 2 provided when the color image pickup device is constituted as a shutter camera, a three color separation optical system CSA, a photo-to-photo conversion element 3, a semi-transparent prism (beam splitter) 4, and a light source 5 for a reading light used in reading optical image information from the photo-to-photo conversion element 3, wherein a laser light source and other arbitrary light sources may be used as the light source 5. The above-mentioned arrangement further includes lenses 6 and 9, polarizing plates 7 and 8 (such polarizing plates 7 and 8 may be used, where necessary), a recording member 10, reels 11 and 12, and an erasing unit EA.

Where the image pickup device is constructed as a device provided with an optical shutter, a charge image produced in the photo-to-photo conversion element 3 in correspondence with a plurality of optical images color-separated by the three color separation optical system, applied to the photo-to-photo conversion element 3 for a time period during which the optical shutter is opened, is read out by light in the form of an optical image, and is projected onto the recording member 10 of which previously recorded information if any has been erased in advance by the erasing unit EA. Also the charge image produced in the photo-to-photo conversion element is erased before opening the shutter.

On the other hand, where the image pickup device with no optical shutter, the operation of the read out and the projection to the recording medium 10 is performed as such that after the read out and the projection, the charge images of three colors in the photo-to-photo conversion element is erased for a subsequent image writing and this procedure is repeated.

When the reading light RL which is allowed to be incident to the photo-to-photo conversion element 3 for reading, the charge image as a single group of pictures, a reading light beam having such a large cross section which irradiates the entirety of the charge image of the single picture at a time, or a flying spot light capable of longitudinally and laterally scanning the charge image in the photo-to-photo conversion element 3 in a predetermined scanning mode may be used to generate a signal of serial optical information in the time domain.

FIG. 19 is a view illustrating the state where three optical images obtained as a result of reading out the three color optical images from the photo-to-photo conversion element and are adjacently recorded into a recording member 10 in the form of tape.

Figure 20:
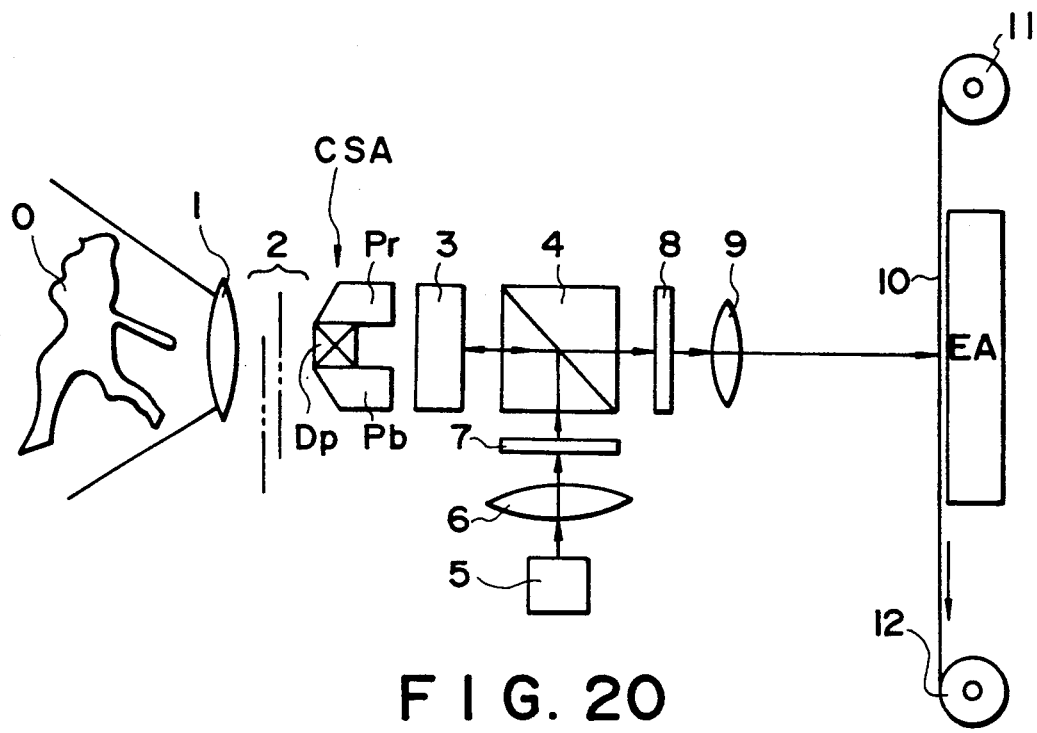
Figure 21:
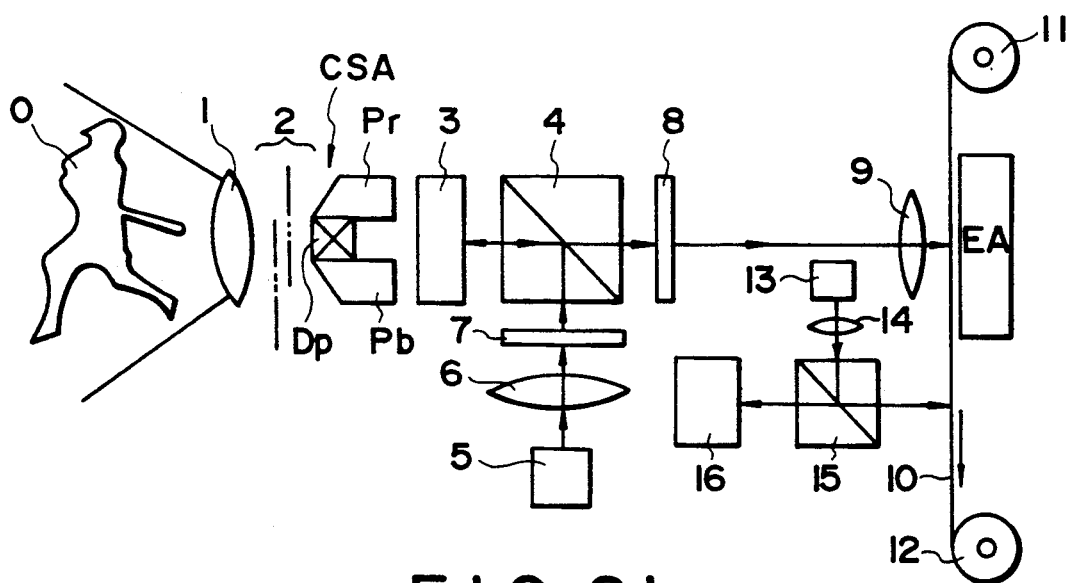
Figure 22:
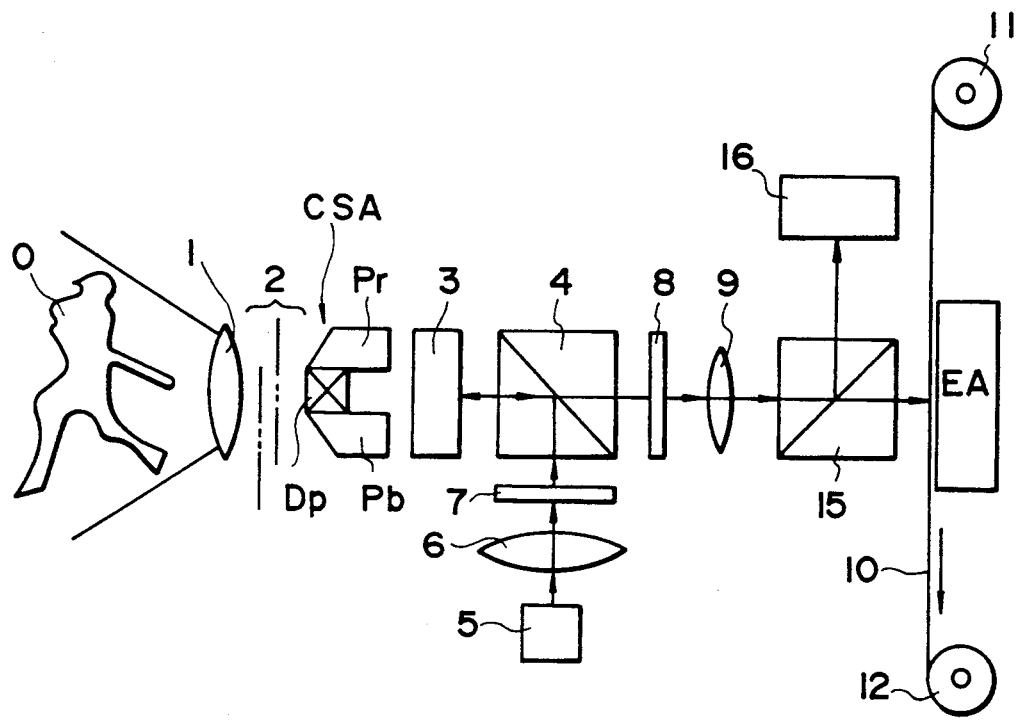
Figure 23:
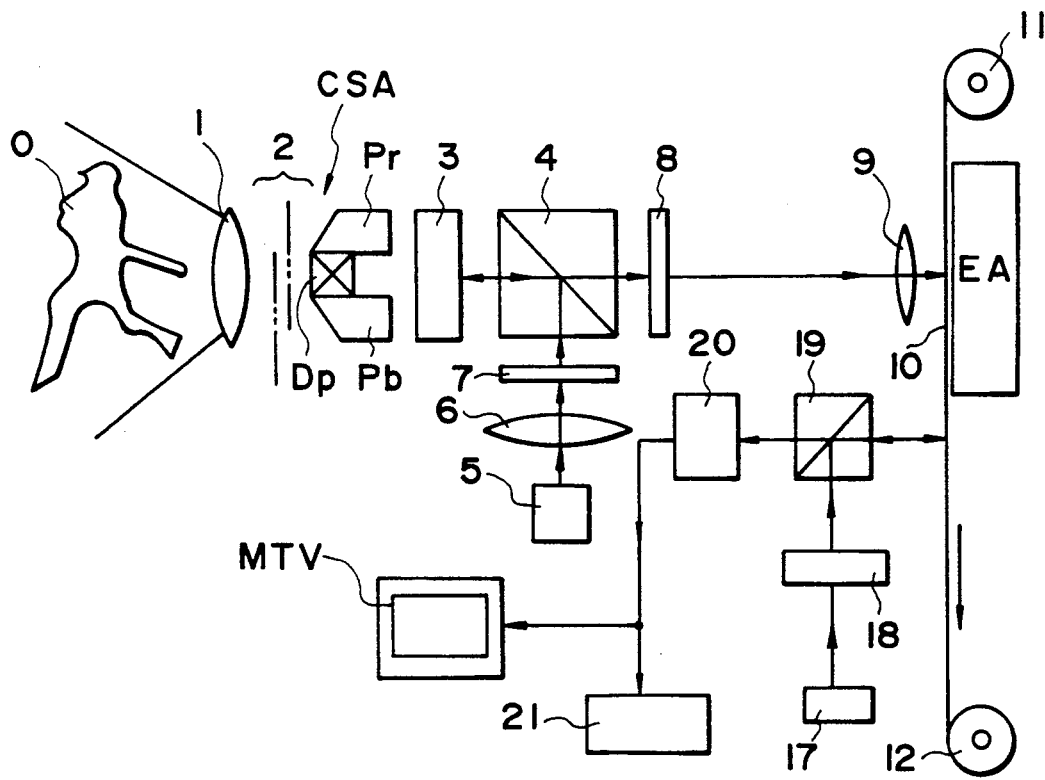

The image pickup device shown in FIG. 20 corresponds to an embodiment where an alteration is made to the image pickup device shown in FIG. 4 such that the erasing operation to the recording member 10 by the erasing unit EA is conducted at the same position as the position where optical image information is recorded onto the recording member 10. Further, the image pickup device of the embodiment shown in FIG. 28 corresponds to an embodiment where the recording member 10 in the form of roll film in the image pickup device shown in FIG. 20 is altered to a piece of recording member for recording one pictorial image.

Figure 9:
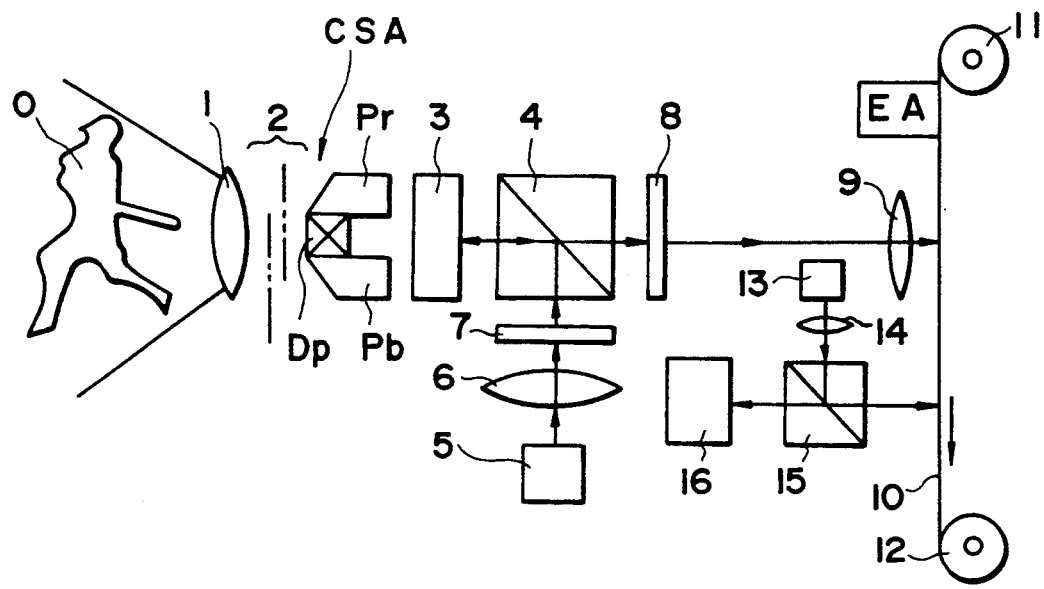
Figure 10:
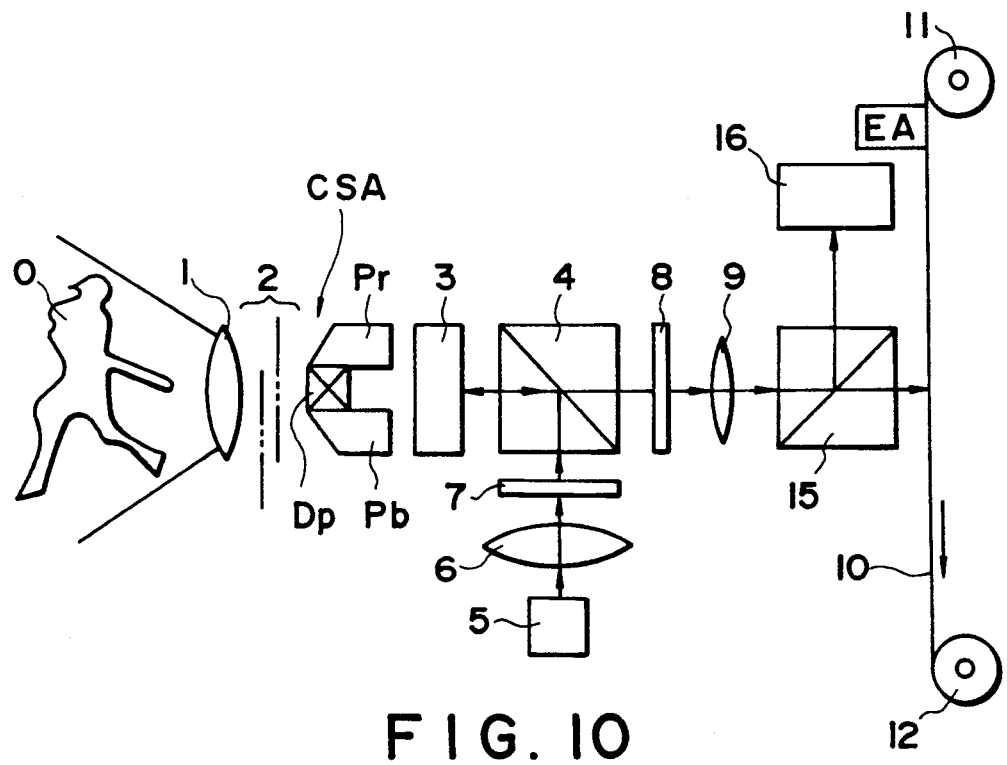
Figure 28:
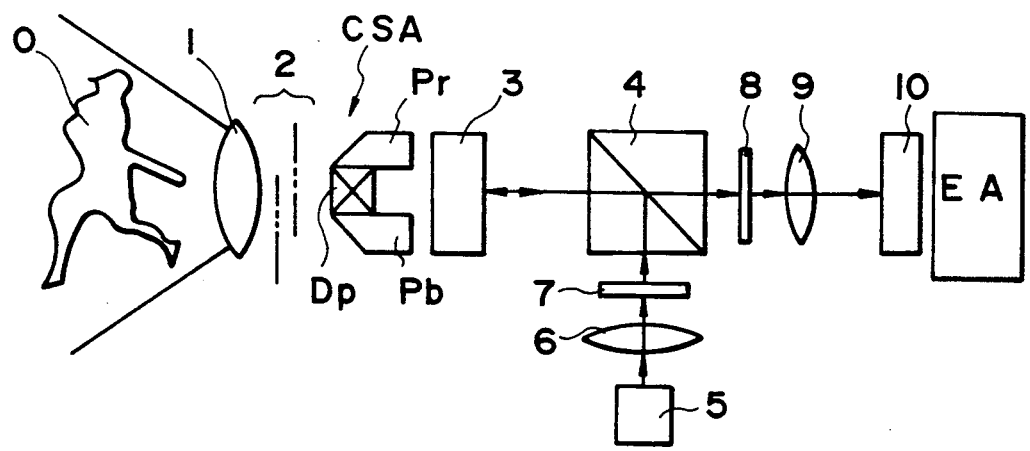
Figure 31:
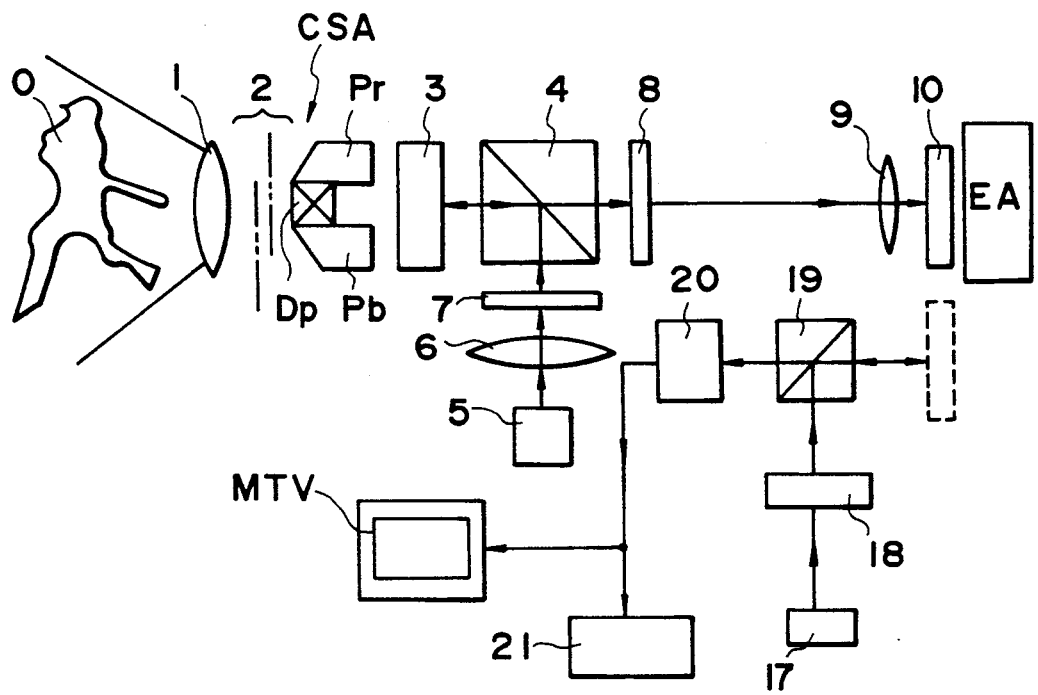

FIG. 9 (FIGS. 21 and 29), and FIG. 10 (FIGS. 22 and 30) are block diagrams showing image pickup devices of embodiments where the signal processing function is added to the image pickup devices shown in FIGS. 4, 20 and 28, respectively, and FIG. 11 (FIGS. 23 and 31) is a block diagram showing an example of an arrangement where the photoelectric conversion function is added to the image pickup devices shown in FIGS. 20 and 28, wherein the same reference numerals as those used in FIGS. 4, 20 and 28 are attached to components corresponding to those in the previously-described image pickup devices shown in FIGS. 4, 20 and 28, respectively.

The image pickup device shown in FIG. 9 (FIGS. 21 and 29) includes a light source 13, a lens 4, a semi-transparent prism 15, and a signal processing unit 16. In the image pickup device shown in FIG. 9 (FIGS. 21 and 29), a light emitted from the light source 13 is projected onto a recorded portion in the recording member 10 through the lens 14 and the semi-transparent prism 15. Further, a light which has transmitted through the semi-transparent prism 15 of the reflected light from the recording member 10 is projected to the signal processing unit 16.

The signal processing unit 16 performs various signal processings such as editing, trimming, and light amplification on the basis of optical image information incident thereto. The signal processing unit 16 is composed of a controllable spatial light modulation element, an irreversible parallel memory, a controllable parallel function element, and a controllable function coupling element, etc. A parallel optical signal processings such as light computer may be performed in the signal processing unit 16.

For the above-mentioned signal processing circuit, a circuit of a structure where various signal processing are implemented to a time-sequential electrical signal obtained which is transformed from a light incident thereto by photoelectric conversion may be used (This applies to signal processing circuits 16 shown in other figures).

It is also possible that the optical image information passed through the transparent prism 15 is directly projected onto an optical monitor screen so that an optical image recorded on the recording member 10 can be monitored.

The image pickup device shown in FIG. 10 (FIGS. 22 and 30) shows a structure such that a semi-transparent prism 15 is provided in the optical path including the lens 9 and the recording member 10 to branch out a portion of the light of optical image information to be recorded onto the recording member 10 to give it to the signal processing unit 16. Thus, the signal processing unit 16 carries out various signal processing such as editing, trimming and optical amplification, etc. on the basis of the optical image information incident thereto.

This embodiment is the same as the above-described embodiment shown in FIG. 9 (FIGS. 21 and 29) in that the signal processing unit 16 may be constituted with a controllable special light modulation element, an irreversible parallel memory, a controllable parallel function element, a controllable function coupling element, etc., and that the parallel optical signal processings may be performed in the signal processing unit 16. Further, in the image pickup device shown in FIG. 10 (FIGS. 22 or 30), the optical image information branched out by the semi-transparent prism 15 may be directly onto the monitor screen so that an optical image to be recorded onto the recording member 10 can be monitored.

The image pickup device shown in FIG. 11 (FIGS. 23 and 31) includes a light source 17, an optical scanner 18 (flying spot scanner), a transparent prism 19, and a light detector 20 (e.g., photodiode, CCD, line sensor), wherein a light emitted from the light source 17 is deffected for scanning, and is then projected onto the recorded portion in the recording member 10 through the transparent prism 19. When the light which has been reflected light from the recording member 10 and passed through the trans-prism 19 is fed to the light detector 20, form which an electric signal corresponding to the optical image information recorded on the recording member 10 is outputted. Thus, this electric signal may be delivered to, e.g., a monitor TV receiver MTV to monitor the recorded information, or fed to a signal processing circuit 21 to carry out editing, trimming, and other signal processing.

FIG. 12 (FIGS. 24 and 32) is a block diagram showing another embodiment of an image pickup device according to this invention wherein recording/reproduction of optical image information on and from the recording member 10 is carried out by the holography method. In FIG. 12 (FIGS. 24 and 32), 0 represents an object. The arrangement shown in this figure includes an imaging lens 1, an optical shutter 2 provided when the image pickup device is constructed as a shutter camera, a three color separation optical system CSA, and a photo-to-photo conversion element 3. For the photo-to-photo conversion element 3, elements as previously described, e.g., a liquid crystal optical modulator, a photoconductive Pockels effect element, a Kerr effect element, a microchannel spatial light modulator, or an element constituted with a photochromic material may be used.

The image pickup device shown in FIG. 12 (FIGS. 24 and 32) further includes a lens 22, a recording member 10 having reversible property, and reels 11 and 12. It is also possible to use a cassette containing the feed reel 11 and the take-up reel 12 and the recording member 10 therein.

In the image pickup device shown in FIG. 12 (FIGS. 24 and 32), three optical images obtained as a result of color separation by the three color separation optical system CSS are formed on the photo-to-photo conversion element 3. It is needless to say that where the image pickup device is constructed as a shutter camera, the optical image of the object 0 is focused on the photo-to-photo conversion element 3 by the imaging lens 1 with the optical shutter 2 being opened.

A light source designated by reference numeral 23 serves to emit a light used as a reading light for the photo-to-photo conversion element 3 and a coherent light commonly used at the time of rewriting a picture of hologram and at the time of reproducing the wave front from the recording member 10. For example, a semiconductor laser may be used as this light source.

A light commonly used for reading an optical image from the photo-to-photo conversion element 3 and for recording a picture of hologram is delivered from the light source 23 to the photo-to-photo conversion element 3 via semi-transparent mirror 25, and convex lens 27. Thus, an optical image corresponding to the optical image of the object is read out from the photo-to-photo conversion element 3. Further, the optical image is delivered to the lens 22 as a signal wave in the holography method, whereby it is formed on the recording member 10 by the lens 22.

Since a coherent light emitted from the light source 23 is delivered to the recording member 10 via semi-transparent mirror 25, and convex lens 26, an optical image of the object is recorded onto the recording member 10 as a hologram corresponding to the optical image of the object appearing on the output side of the photo-to-photo conversion element 3, i.e., the hologram of three colored optical images obtained as a result of color separation performed the three color separation optical system CSA.

In the image pickup devices shown in FIGS. 12 and 24, a recording member in the form of roll film is used as the recording member 10, and is moved from the feed reel 11 toward the take-up reel 12 in a predetermined movement form by a drive mechanism (not shown). Namely, where the image pickup device is operative in the operating mode as a shutter camera, the recording member 10 is transferred by a distance corresponding to one frame (corresponding to one pictorial image) after the optical shutter 2 is opened for a predetermined time period and is then closed. On the other hand, where the image pickup device is operative in the operating mode as a moving picture camera, such an intermittent feeding is conducted to rapidly transfer the recording member 10 by a distance at an increment of one frame (corresponding to one pictorial image) after the recording member 10 is momentarily stopped for a predetermined time period to carry out recording of each pictorial image. It is to be noted that the same mechanism as a well known transfer mechanism in a movie camera may be used as the intermittent transfer mechanism for the recording member 10.

Figure 32:
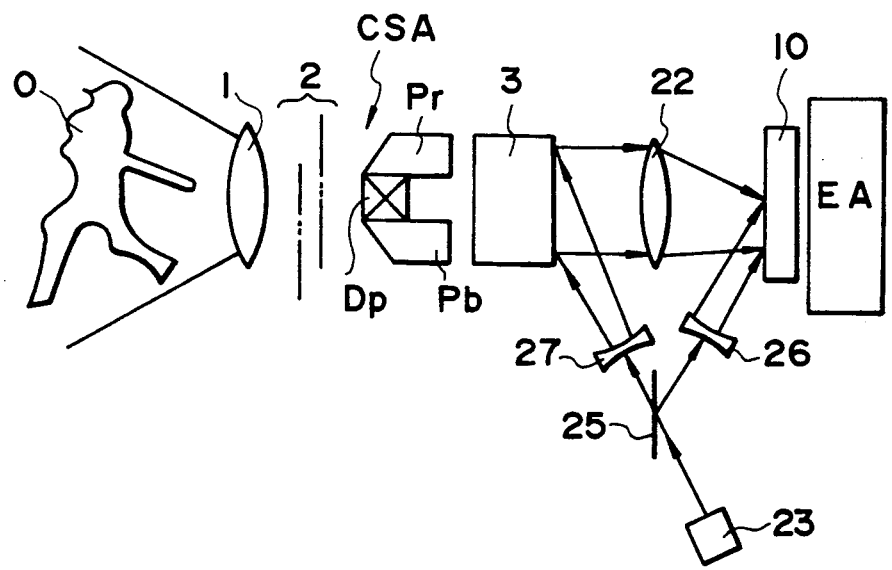

For the recording member 10 in the image pickup device shown in FIG. 32, a recording member for recording a single pictorial image is used.

The recording member 10 in the image pickup device shown in FIG. 12 is transferred to the recording position after the recorded information is erased by the erasing unit EA. The image pickup device of the embodiment shown in FIG. 24 corresponds to an embodiment where an alteration is made to the image pickup device shown in FIG. 12 such that the erasing operation for the recording operation 10 by the erasing unit is conducted at the same position as the position where recording of optical image information is applied to the recording member 10. Further, the image pickup device of the embodiment shown in FIG. 32 corresponds to an embodiment where the recording member 10 in the form of roll film in the image pickup device shown in FIG. 24 is altered to a recording member for recording one pictorial image.

The method for erasing an optical image an the recording member in the case where the optical image is recorded on the recording member in the form of electrostatic charge image (hereinafter called "charge image") will be described with reference to FIGS. 33 to 40.

Figures 33, 34:
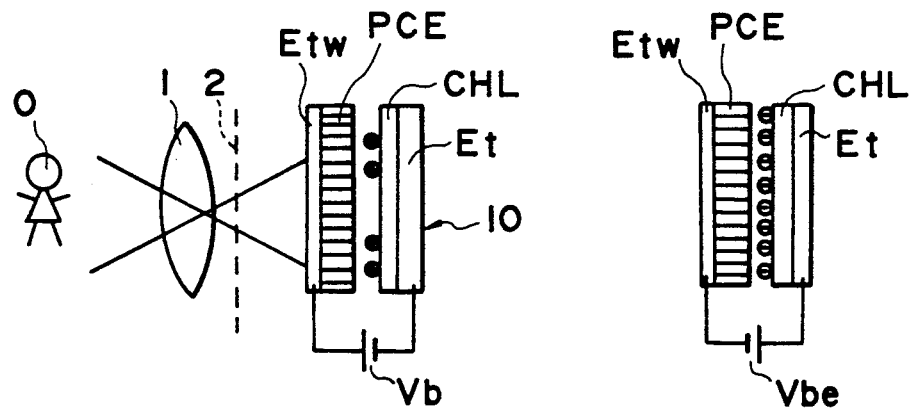
FIGS. 33 to 40 are views for explaining an erasing method in the case where recording into the recording member is conducted by a charge image.

FIG. 33 shows an embodiment of the arrangement of an image pickup device constructed to record an optical image onto the recording member 10. This embodiment is characterized in that an object 0, an imaging lens 1 and a shutter 2 are added to the arrangement previously described with reference to FIG. 18. The constituent part consisting of the transparent electrode Etw and the photoconductive layer member PCE constitutes a recording head functioning as an optical image-to-charge image conversion member. In the condition where recording operation is conducted, the end surface of the recording head, i.e., the end surface of the photoconductive layer member PCE and the surface of the charge hold layer CHL in the recording member are connected with each other, or are opposing to with an extremely small spacing therebetween.

The recording member is constituted by an electrode Et also used as the substrate and charge hold layer CHL comprised of a layer of an insulating material (e.g., high molecular material). In recording, power source Vb is connected between the both electrodes Et and Etw so that an electric field is applied across the electrode Et of the recording member and the electrode Etw in the recording head.

At the time of the recording operation, an optical image is formed on thé photoconductive layer member PCE in the recording head. Since a constant voltage is applied from the power source Vb across the electrode Etw and the electrode Et, the electric resistance of the photoconductive layer member PCE is changed in correspondence with an intensity distribution of the optical image focused thereon. As a result, a charge image pattern corresponding to the optical image incident to the recording head appears on the end surface of the recording head, i.e., the end surface of the photoconductive layer member PCE. This causes, across the extremely small spacing mentioned before, or through the contact, a transfer of the charge image from the end surface of the recording head to the charge hold layer CHL is determined in the recording member. In a manner stated above, the polarity of the charge image formed on the charge hold layer CHL is determined in relation to an applied voltage delivered from the power source Vb across the electrode Etw and the electrode Et at the time of the recording operation.

Figure 39A:
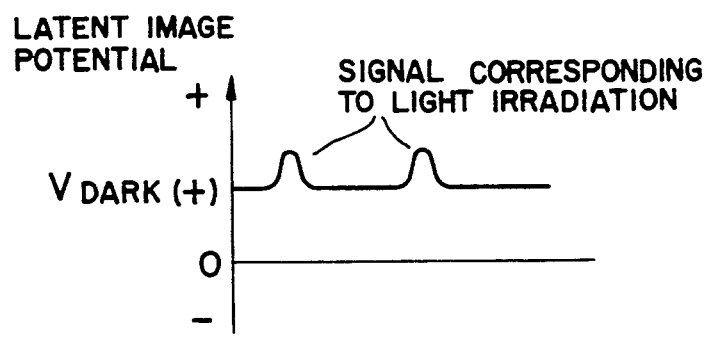

For example, in the embodiment shown in FIG. 33, the positive potential of the power source Vb is applied to the electrode Etw and the negative potential of the power source Vb is applied to the electrode Tt, whereby a charge image of plus charges is formed on the surface of the charge hold layer CHL of the recording member as shown. FIG. 39(a) is a view illustrating the state where a plus charge image is formed as stated above, so that a potential of the charge image is elevated wherein Vbright represents the bright portion of the charge image and Vdark (+) represents a so-called dark potential.

Figure 39B:
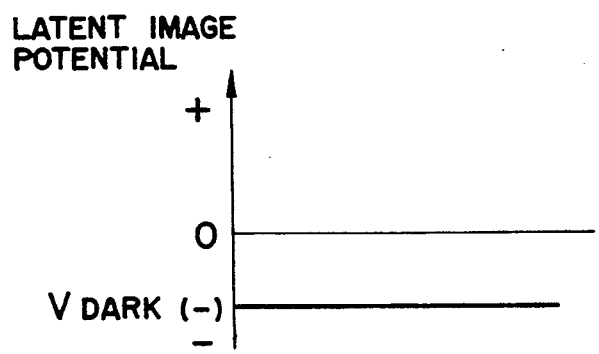

FIG. 34 is an explanatory view showing the method of erasing such a positive charge image formed on the surface of the charge hold layer CHL by uniformly appending minus charges onto the surface of the charge hold layer CHL. The charge hold layer CHL of the recording member in FIG. 34 is placed in a dark room and is connected to a power source Vbe for erasing, as such that the positive voltage is applied to the electrode Et, and the negative voltage is applied to the electrode Etw. It should be noted that a conductivity of the photoconductive layer member, PCE is higher even with no incident light than that of the charged hold layer CHL, which is highly insulative. Therefore, negative charges from the electrode Etw move within the photoconductive layer member PCE. Thus the surface of the photoconductive layer member is providing a potential of the electrode Etw in the dark condition. Thus, the positive charge image is erased by a uniform application of minus charges on the surface of the charge hold layer CHL of the recording member. In FIG. 39(b), the charge erased state obtained by a uniform application of minus charges is represented by a constant potential of Vdark (−).

Namely, in accordance with the erasing method shown in FIG. 34, in erasing the charge image recorded on the charge hold layer CHL of the recording member, a voltage having a polarity opposite to that of a voltage applied to the charge hold layer CHL in the recording is applied to the charge hold layer CHL in the dark room.

Figure 35:
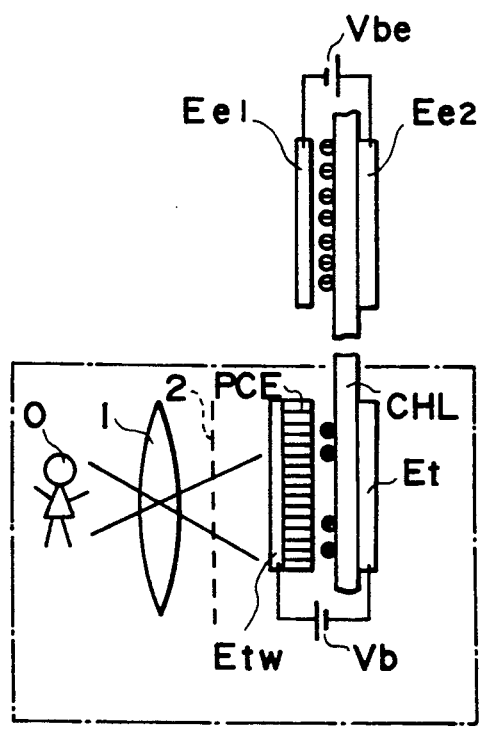

The components shown within a frame indicated by one dot chain line in FIG. 35 are the same components as those of the image pickup device shown in FIG. 33. The part shown above within the frame corresponds to the portion where the erasing operation shown in FIG. 34 is carried out. FIG. 35 shows an arrangement adapted to erase the charge image formed on the charge hold layer CHL before the charge image is recorded onto the charge hold layer CHL in the image pickup device illustrated within the frame.

Figure 36:
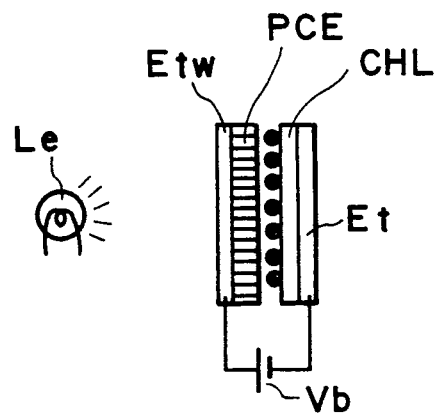
Figure 39C:
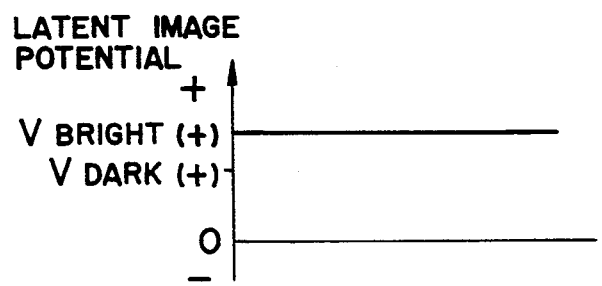

FIG. 36 shows an example of a method of irradiating a light emitted from the light source Le to the record head comprised of a transparent electrode Etw and a photoconductive layer member PCE and functioning as an optical image-to-charge image conversion member. Erasing is performed by connections the positive electrode of the power source Vb to the electrode Etw, and by connecting the negative electrode of the power source Vb to the electrode Et to append uniform plus charges on the surface of the charge hold layer CHL and saturate it with the plus charges. In FIG. 39(c), the charge erased state obtained by uniform application of plus charges formed in a manner stated above is represented by a constant potential of Vbright (+).

In order to initialize the charge hold layer CHL which is intended to record a charge image of positive polarity as shown in FIG. 33, described with reference to FIG. 36 so that uniform plus charges are appended to the surface of the charge hold layer CHL, then the image pickup device is brought into the arrangement shown in FIG. 34, thereby placing the charge hold layer CHL in the state where uniform minus charges are appended onto the surface of the charge hold layer CHL of the recording member. Accordingly, the image pick up device becomes ready for conducting a new recording operation.

Figure 37:
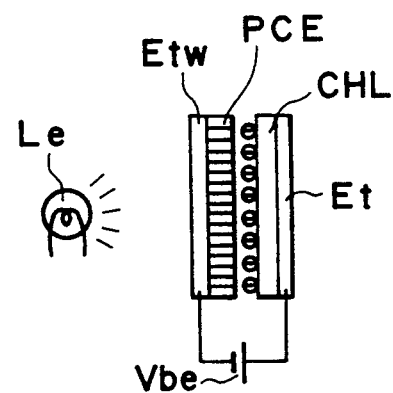
Figure 39D:
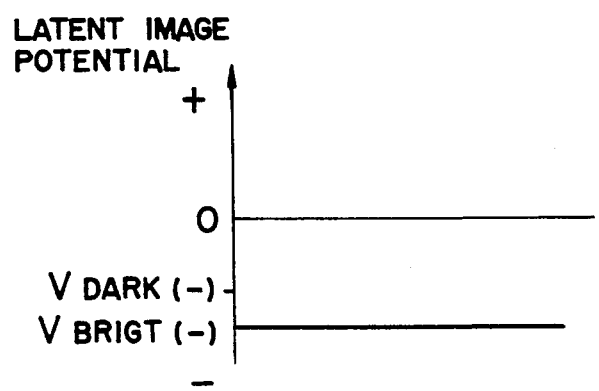

FIG. 37 shows an example of a method of irradiating a light emitted from the light source Le to the recording head comprised of transparent electrode Etw and photoconductive layer member PCE and functioning as an optical image-to-charge image conversion member. The negative electrode of the power source Vbe for erasing is connected to the electrode Etw, and the positive electrode of the erasing power source Vbe is connected to the electrode Et to append uniform minus charges on the surface of the charge hold layer CHL of the recording member to thereby conduct erasing. In FIG. 39(d), the charge erased state obtained by uniform application of minus charges formed in a manner stated above is represented by a constant potential of Vbright (−).

Figure 38A:
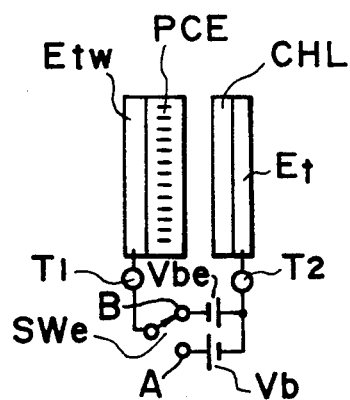
Figure 38B:
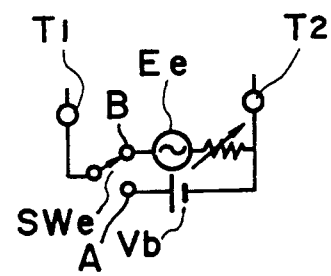

FIG. 38(a) shows an arrangement that the positive electrode of the power source Vb is connected to the fixed contact A of the changeover switch SWe of which the movable contact is connected to the terminal T1 for the electrode Etw, and the negative electrode of the erasing power source Vbe is connected to the fixed contact B of the changeover switch SWe, both the negative electrode of the power source Vb and the erasing power source Vbe are connected to the terminal T2 for the electrode Et, whereby at the time of the image pick-up operation, the movable contact of the changeover switch SWe is switched to the fixed contact A of the changeover switch SWe, to conduct an image pick up operation, and at the time of the erasing operation, the movable contact of the changeover switch SWe is interchangeably switched to either of two fixed contacts. FIG. 38(b) shows an arrangement that connect the positive electrode of the power source Vb is connected to the fixed contact A of the changeover switch SWe of which movable contact is connected to the terminal T1 for the electrode Etw, and one end of the erasing a.c, power source Ee is connected to the fixed contact B of the changeover switch SWe, and both the negative electrode of the power source Vb and the other end of the erasing a.c. power source Ee are connected to the terminal T2 for the electrode Et, whereby at the time of the image pick up operation, the movable contact of the changeover switch SWe is switched to the fixed contact A of the changeover switch SWe, to conduct an image pick-up operation, and at the time of the erasing operation, the movable contact of the changeover switch SWe is switched to the fixed contact B for connecting the erasing a.c. power source Ee to the electrodes Etw and Et.

It is effective for satisfactorily erasing the charge image that an alternating voltage from the erasing a.c. power source Ee has an output amplitude gradually lowering as time progresses. For this reason, a variable resistor may be provided to the erasing a.c. power source Ee as shown in FIG. 38. The advantage of using the a.c. power source having gradually lowering output amplitude is that there is no need to select a correct polarity of the d.c. erasing power source with respect to the applied polarity used for previous recording operation. The initial voltage and frequency of the a.c. power source may be 300 Vp-p and few hundred Hz respectively. Further, it is also effective for satisfactorily erasing the charge image that at the end of erasing operation by the a.c. power source, the application of the alternate current to the recording member is cut-off at an instant when the polarity of the alternate current is opposite to that of the applied voltage used for the recording of the charge image, thus to erase the charge image.

Figures 40, 41:
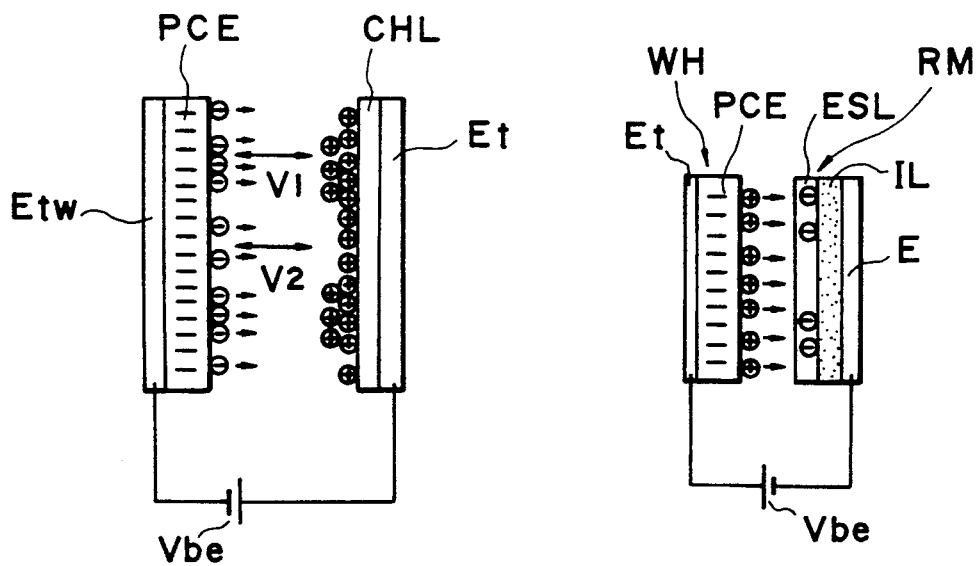
FIGS. 41 to 46 are block diagrams for explaining a method for erasing an electrostatic latent image in the charge image recording medium of the invention, respectively.

FIG. 40 is a view for explaining the erasing operation in the dark room in the case of a positive charge image formed on the surface of the charge hold layer CHL of the recording member as illustrated in FIG. 39(a), the erasing is performed by uniformly appending minus charges on the surface of the charge hold layer CHL of the recording member, wherein V1 represents a high potential portion (highlight) of the recorded charge image where plus charges are accumulated by recording and V2 represents a low potential portion of the recorded charge image which is lower than the voltage V1 {the low potential portion of the charge hold layer CHL represents Vdark (+)}.

Under the condition described above, the erasing power source Vbe is connected as shown in FIG. 40 with the negative electrode being connected to the electrode Etw this neutralizes the plus charges on the surface of the charge hold layer CHL and eventually minus charges are uniformly appended to the surface of the charge hold layer CHL, so that the charge image is erased, resulting in a fixed potential of Vdark (−) as shown in FIG. 39(b).

The foregoing described novel image pick up devices with erasing capability for recording and effectively erasing an electrostatic charge image on the reversiblle i.e. erasable and rewritable recording member which includes photochromic material, thermoplastic film, magneto-optical material, material having a spacial light modulation function, and highly insulative material of high molecular type which can store the electrostatic charge image. The erasing methods and arrangements described include application of charges to the recorded charge image, in the dark room as with the polarity of which is opposite to the one used for recording and applications of charges under a light irradiated condition with the polarity of charges same as the one used for recording to cause saturation and applications of an a.c. current an amplitude of which may be gradually decreased, or applications of the a.c. current being terminated at an instant of the polarity opposite to the one used for recording. The electrostatic charge image may be a group of three images of different colors separated be a three color separation optical system to which an optical image is projected either directly or via an optical shutter. In some of the embodiments, an optical image is momentarily stored in the micro-channel spacial light modulation element and read out therefrom for projecting the readout image onto a recording medium.

METHOD OF ERASING ELECTROSTATIC LATENT IMAGE

By making reference to FIGS. 48 to 51 showing the recording system for in recording information onto a charge image recording medium RM, how the information is recorded as an electrostatic latent image into at least a charge image recording medium RM and is erased will be described.

Figure 48:
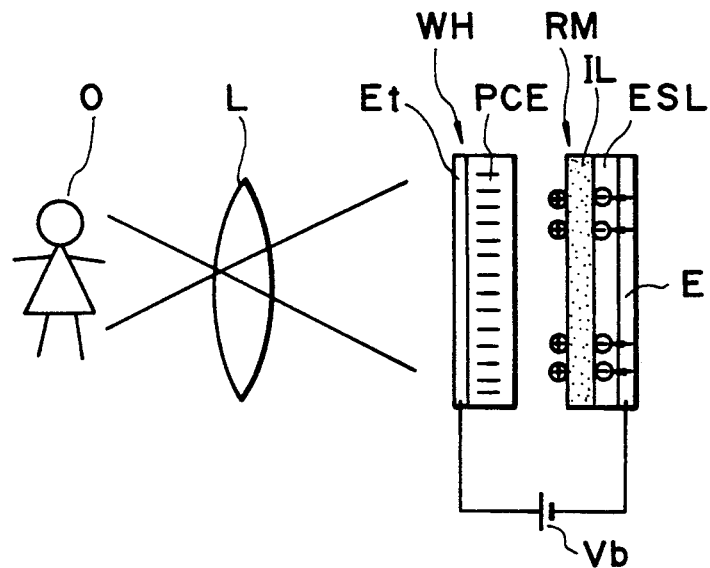
Figure 49:
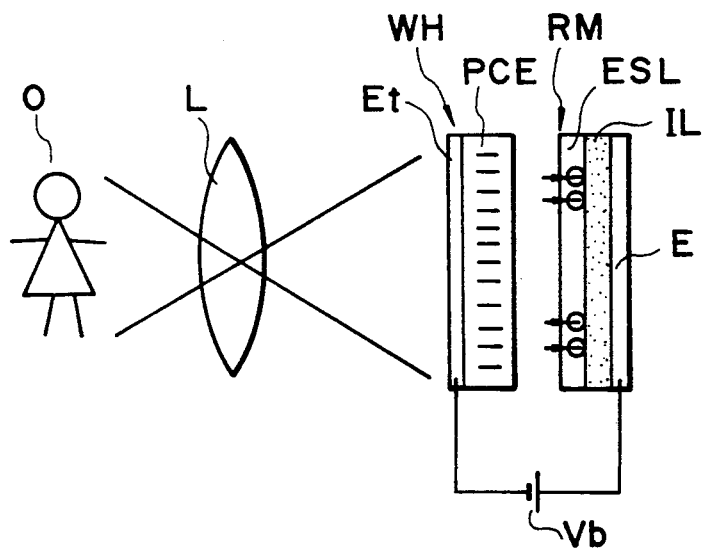

In FIGS. 48 to 51, RM denotes a charge image recording medium (of which portion is illustrated as a side cross sectional view) constructed so that an electrostatic latent image can be stored into the recording medium. In FIGS. 48 to 50, WH denotes a write head used for recording information subject to recording onto the charge image recording medium RM. This write head WH is of a stacked structure of a transparent electrode Et and a photoconductive layer member PCE. For the transparent electrode Et, e.g., a metal thin film, a nesa film, or the like may be used. Further, the photoconductive layer member PCE may be constituted with a thin film of a suitable photoconductive material.

In FIGS. 48 to 50, 0 denotes an object wherein the arrangement illustrated in each figure includes an imaging lens L, a power source Vb, and an electrode E. In FIG. 51, Lw represents a light source for writing.

The charge image recording medium RM each shown in FIGS. 48 and 49 is of a stacked structure of a charge transfer suppressive layer member ESL and a dielectric layer member IL. In the example of the arrangement of the charge image recording medium RM shown in FIG. 48, an electrode E is provided on the surface of the charge transfer suppressive layer member ESL. Further, in the example of the arrangement of the charge image recording medium shown in FIG. 49, an electrode E is provided on the surface of the dielectric layer member IL.

In addition, the charge image recording medium RM each shown in FIGS. 50 and 51 has a structure such that an electrode E is provided on the surface of the dielectric layer member IL with in which a layer of fine particles PCG of a photoconductive material is provided.

For the dielectric layer member IL in the charge image recording medium RM, a member constituted with a dielectric material having a high insulating resistance, e.g., a high molecular material film suitable for this purpose may be used. Moreover, the charge transfer suppressive layer member ESL may be comprised of a dielectric thin film through which a current is permitted to flow by the tunnel effect when a large electric field is applied thereto. For this charge transfer suppressive layer member ESL, a member constituted with, e.g., a thin film layer of silicon dioxide, a thin film of alumina, or the like may be used.

The layer of the fine poarticles PCG of photoconductor in the charge image recording medium RM is of a structure such that a large number of fine particles PCG of photoconductor are distributed and buried separately from each other by any suitable means on the side of a dielectric layer opposite to the side facing electrode E. If necessary, a thin film of dielectric body may be further deposited on the layer of the PCG layer by, e.g., vacuum deposition method or sputtering method.

The photoconductive fine particles PCG may be such a photoconductive material used for, e.g., the photoconductive layer PCE being pulverized. The function of the photoconductive fine particles is identical to that of ordinary photoconductors having property generating pairs of electrons and holes by irradiation of light, and there is therefore no difference therebetween in the physical characteristic.

The photoconductive layer member PCE in this case is used for formation of latent image. When this layer undergoes irradiation of light, electron-positive hole pairs are generated, so that the impedance in the thickness direction of the layer is varied (electron-positive hole pairs are moved in the thickness direction).

On the other hand, the PCG dispersed layer is used for holding electrostatic charges. Since respective particles are insulated each other by dielectric material, generation of electron-positive hole pairs by irradiation of light takes place per each particle unit, so that there is no flow of carriers between particles.

Additionally, in order to place the photoconductor fine particles PCG in the state where they are distributed separately from each other, e.g., a method may be employed to vacuum-deposit or sputter a photoconductor material through a mask pattern.

The charge image recording medium RM may be constructed by forming in succession respective constituent layers by the vacuum deposition method, the sputtering method, or other means in order to stack respective constituent layers on the dielectric layer member IL.

The charge image recording medium RM may be in the form of disk, sheet, tape or card, or in any other form.

In the electrostatic latent image recording system shown in FIG. 48, the charge image recording medium RM is such that the electrode E is in contact with the surface of the charge transfer suppressive layer member ESL, and that the photoconductive layer member PCE of the write head WH is opposing to the surface of the dielectric layer member IL stacked on the charge transfer suppressive layer member ESL with an extremely small spacing therebetween.

In the recording operation, the power source Vb is connected between the transparent electrode Et in the write head WH and the electrode E of the recircling medium RM and an optical image of the object 0 is projected toward to the transparent electrode Et of the write head WH through the imaging lens L.

In the recording system shown in FIG. 48, when an optical image of the object 0 is formed in the photoconductive layer member PCE through the transparent electrode Et in the write head WH by the imaging lens L, the electric resistance value of the photoconductive layer member PCE varies in accordance with the intensity distribution of the optical image of the object 0 formed thereon. As previously described, since the power source Vb is connected between the transparent electrodce Et and the electrode E so that the positive electrode of the power source Vb is connected to the transparent electrode Et. Under this condition, as the electric resistance value of the photoconductive layer member PCE varies in accordance with the optical image of the object formed thereon as stated above, a potential of each of the stacked members between the transparent electrode Et and the electrode E varies in accordance with the intensity distribution of the optical image of the object 0.

Thus, through a gaseous discharge between the photoconductive layer member PCE and the surface of the dielectric layer member IL, medium RM, so that a positive charge image corresponding to the optical image of the object 0 is formed on the surface of the dielectric layer member IL in the charge image recording medium RM.

When the positive charge image is thus formed on the surface of the dielectric layer member IL of the charge image recording medium RM, a strong electric field by the positive charge image is applied between the surface of the dcielectric layer member IL and the electrode E. This causes that electrons from the electrodes E flow as a tunnel current toward the dielectric layer member IL through the charge transfer suppressive layer member ESL by the tunnel effect. As a result a negative charge image corresponding to the positive charge image, i.e., an electrostatic latent image corresponding to the optical image of the object 0, is recorded at the boundary surface between the charge transfer suppressive layer member ESL and the dielectric layer member IL.

Since the electrostatic latent image thus recorded interposed between the charge transfer suppressive layer member ESL and the dielectric layer member IL, it can be kept stable for a prolonged period of time.

The embodiment shown in FIG. 49 is different from the one shown in FIG. 48, of the positions of IL and ESL which are reversed each other and the power source Vb connected reversely. Because of this reversed arrangement, electrons from the photoconductive layer member PCL flow toward the dielectric layer member IL through the charge transfer suppressive layer member ESL by the tunnel effect, resulting an electrostatic latent image of negative charges corresponding to the optical image of the object 0 is recorded at the boundary surface between the charge transfer suppressive layer member ESL and the dielectric layer member IL.

In the electrostatic latent image recording system shown in FIG. 50, the charge image recording medium RM is such that the electrode E is in contact with one surface of the dielectric layer member IL with in which a layer of the fine particles PCG of a photoconductive material is provided, and that the surface of the photoconductive layer member PCE of the write head WH is opposing to the dielectric layer member IL with an extremely small spacing therebetween.

In the recording operation, power source Vb is connected between the transparent electrode Et in the write head WH and the electrode E with the electrode Et being connected to a negative termianl of the power source Vb, and an optical image of the object 0 is projected toward the transparent electrode Et of the write head WH through the imaging lens L.

In the recording system shown in FIG. 50, when an optical image of the object 0 is formed on the photoconductive layer member PCE through the transparent electrode Et of the write head WH by the imaging lens L, the electric resistance value of the photoconductive layer member PCE varies in accordance with the intensity distribution of the optical image of the object 0 formed thereon. As previously described, since the power source Vb is connected between the transparent electrode Et of the write head WH and the electrode E with the negative terminal of the power source Vb being connected to the transparent electrode Et, the electric resistance value of the photoconductive layer member PCE varies in accordance with the optical image of the object formed therein as stated above, so that a potential of each of the stacked members between the transparent electrode Et and the electrode E varies in accordance with the intensity distribution of the optical image of the object 0.

Thus, through a gaseous discharge between the photoconductive layer member PCE and the surface of the dielectric layer member PCE, a negative charge image corresponding to the optical image of the object 0 is formed on the surface of the dielectric layer member IL of the charge image recording medium RM.

When a light is irradiated without the connection of the power source Vb, as shown in FIG. 51(a), to the surface of the dielectric layer member IL on which a negative charge image is formed in correspondence with the optical image of the object 0 as stated above, the irradiated light reaches the fine particles PCG of photoconductor embedded in the dielectric layer member IL, so that electron-positive hole pairs are generated in the fine particles PCG of photoconductor as shown in FIG. 51(a), this causes the electrons of the negative charge image formed on the surface of the dielectric layer member IL moving into the dielectric layer member IL by the tunnel effect to reach to and neutralize the positive holes of the electron-positive hole pairs in the fine particles PCG of photoconductor. As a result, electrons i.e. negative charges of the electron-positive hole pairs of the fine particles PCG are left in the dielectric layer number as shown in FIG. 51(b), resulting in the state where negative electrostatic latent image corresponding to the optical image of the object 0 is recorded.

Since the electrostatic latent image recorded as a part of the fine particles PCG of photoconductor embedded in the dielectric layer member IL is surrounded by the dielectric material as stated above, it can be kept stable for a long time period.

For reading the recorded information on the charge image recording medium RM as an electrostatic latent image as described with reference to FIGS. 48 to 51, an electrostatic read head EDA as shown in FIG. 52, or using an optical read head RH as shown in FIG. 53 may be used.

Figure 54:
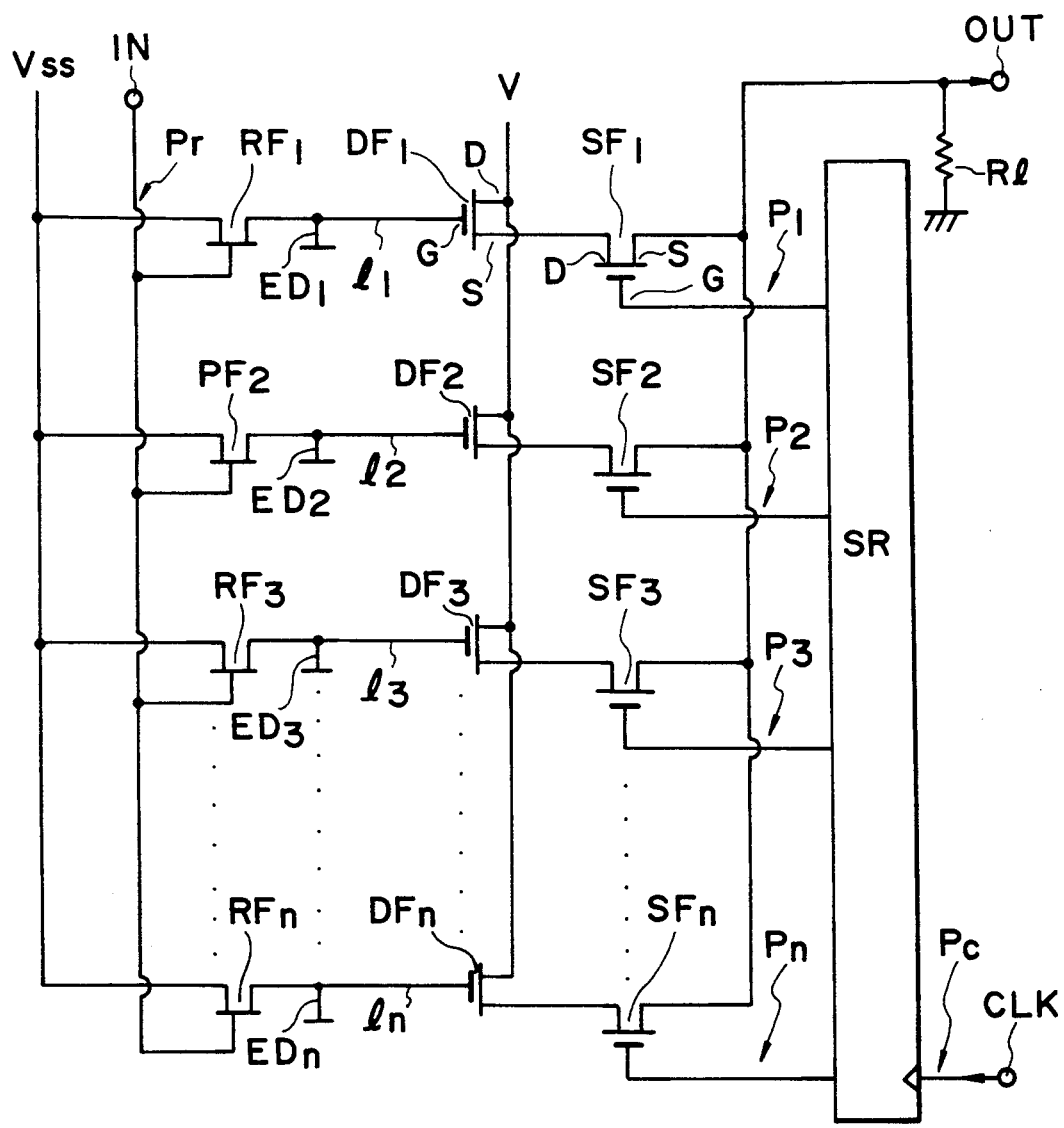
FIG. 54 is a block diagram showing one form of an electrostatic read head used in FIG. 52.
Figure 55:
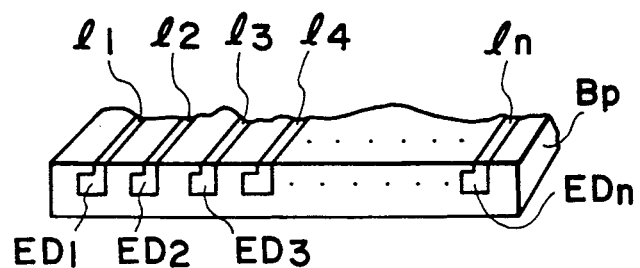
FIG. 55 is a perspective view showing another form of an electrostatic read head used in FIG. 52.
Figure 56:
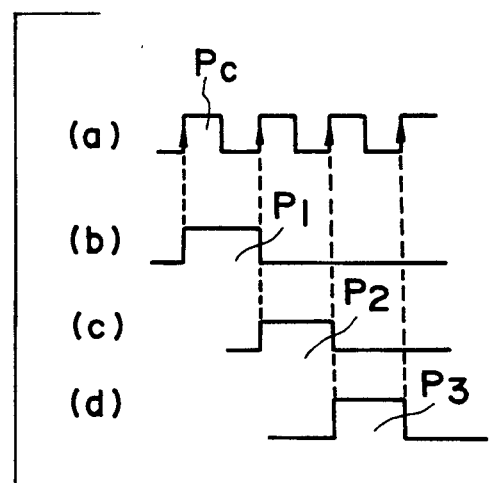
FIG. 56 is a waveform diagram for explaining the operation.
Figure 57:
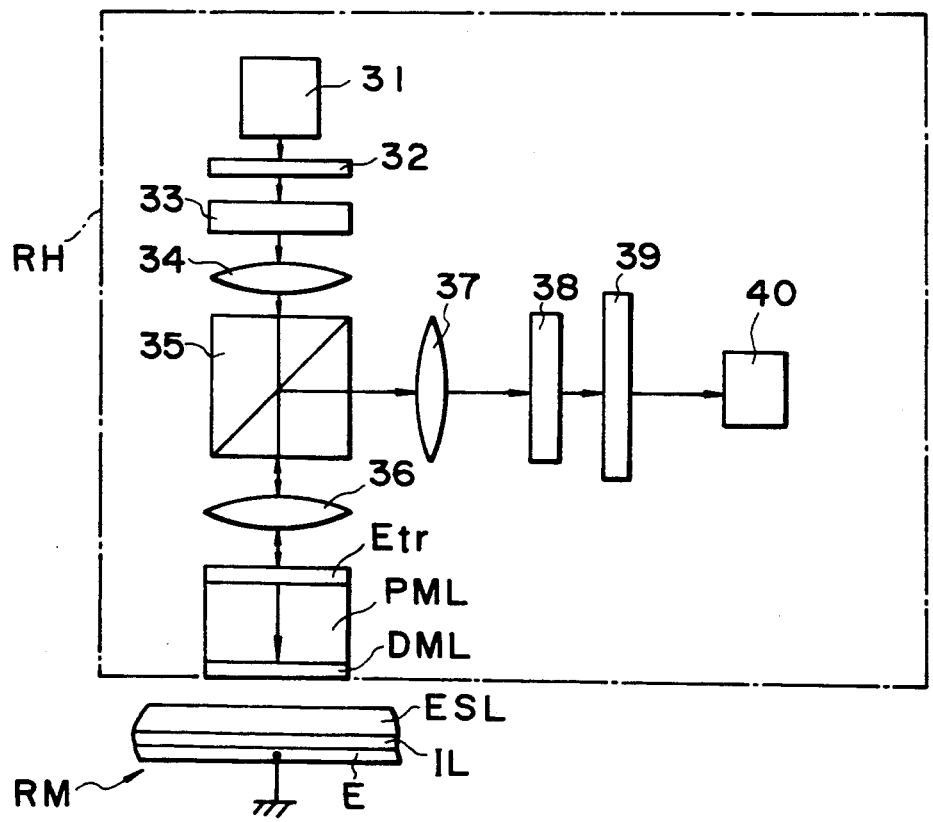
FIG. 57 is a block diagram showing an example of the arrangement of an optical read head used in FIG. 53.

FIG. 54 is a block diagram showing an example of an electrode arrangement of the above-mentioned electrostatic read head EDA, FIG. 55 is a perspective view showing the arrangement of the electrostatic read head, FIG. 56 is a waveform diagram for explaining the operation thereof, and FIG. 57 is a block diagram showing an example of the arrangement of the above-mentioned optical read head.

The electrostatic read head EDA will be first described with reference to FIGS. 54 to 56. FIG. 54 shows an example of the configuration of the head for detecting an electrostatic charge including a plurality of voltage detection electrodes ED1, ED2, ... arranged in a predetermined arrangement pattern to read an electrostatic latent image in the charge image recording medium RM.

In FIG. 54, the electrodes, ED1, ED2, ED3 ... EDn are connected to the gate electrodes of voltage detection field effect transistors DF1, DF2, DF3 ... DFn by individual connection lines l1, l2, l3 ... ln, and are also connected to corresponding drains of field effect transistors RF1, RF2, RF3 ... RFn used as switching means for reset, respectively.

The gate electrodes of the respective field effect transistors RF1, RF2, RF3 ... RFn used as the switching means for reset are connected commonly to the input terminal 2N for receiving a reset pulse, and the source electrodes of the respective field effect transistors RF1, RF2, RF3 ... RFn are connected commonly to the power source Vss which supplies a reference voltage to the voltage detection electrodes and the gate electrodes of the voltage detection field effect transistors at the time of reset operation.

The drain electrodes of respective voltage detection field effect transistors DF1, DF2, DF3 ... DFn are connected commonly to the operating power source V. Thus, a fixed voltage is applied thereto. Further, the source electrodes of the respective voltage detection field effect transistors DF1, DF2, DF3 ... DFn are connected to corresponding ones of drain electrodes of respective individual switching field effect transistors SF1, SF2, SF3 ... SFn. Furthermore, respective source electrodes of the individual switching field effect transistors SF1, SF2, SF3 . . . SFn are connected commonly to the output OUT. In FIG. 54, Rl denotes a load resistor.

To respective gate electrodes of the individual switching field effect transistors SF1, SF2, SF3 . . . SFn, switching pulses P1, P2, P3 . . . Pn are delivered from the shift register SR. As apparent from the waveform diagram illustrated in FIG. 56, switching pulses P1, P2, P3 . . . Pn are sequentially output from the shift register SR as indicated by P1→P2→P3→. . . with the timing as illustrated in FIGS. 56(a) to (d) driven by the clock signal Pc shown in FIG. 56(a) delivered to the clock terminal CLK of the shift register SR. As a result, selected ones of the individual switching field effect transistors SF1, SF2, SF3 . . . SFn are sequentially turned on the time base after another.

When the voltage detection electrodes ED1 to EDn are opposing to the image recording medium RM, voltages, corresponding to surface potentials at respective plural portions of the charge image recording medium RM, are generated by the electrostatic induction from the voltage detection electrodes ED1, ED2, ED3 . . . EDn which are respectively connected to the gate electrodes of the voltage detection field effect transistors DF1, DF2, DF3 . . . DFn by means of individual connection lines 1, 2, 3, . . . n. The generated voltages are delivered from the sources of the plural voltage detection field effect transistors DF1, DF2, DF3 . . . DFn to the drains of individual switching field effect transistors SF1, SF2, SF3 . . . SFn. From the sources sides of individual switching field effect transistors SF1, SF2, SF3 . . . SFn which are turned on one after another according to the switching pulses P1, P2, P3 . . . , a signal representative of the voltages produced on the individual voltage detection electrodes ED1, ED2, ED3 . . . EDn in correspondence with surface potentials at respective plural places of the charge image recording medium RM, is outputted as a continuous signal.

Accordingly, when the read head EDA provided in a manner that a plurality of voltage detection electrodes ED1, ED2, ED3 . . . EDn are linearly arranged and the charge image recording medium RM are relatively moved in a direction perpendicular to the arrangement direction of the electrodes ED1, ED2, ED3 . . . EDn, a time-sequential electric signal corresponding to the two-dimensional charge image formed on the charge image recording medium RM is outputted to the output terminal 1.

The above-mentioned read head EDA shown in FIG. 55 may be of a structure such that a plurality of voltage detection electrodes ED1, ED2, ED3 . . . EDn, correction lines l1 to ln, and the like are formed on the base plate BP by means of well known thin film forming technique.

As apparent from the foregoing explanation made with reference to FIGS. 54 to 56, in the reproducing system shown in FIG. 52 using electrostatic read head EDA in reproducing information recorded as a charge image in the charge image recording medium RM, it is possible to satisfactorily reproduce, as an electric signal, the charge image recorded in the charge image recording medium RM.

The optical read head RH will be now described with reference to FIG. 57. In FIG. 57, E represents an electrode, and a dielectric mirror DML in the read element of the charge image read head RH is located at the positoin opposite to the surface of the charge transfer suppressive layer member ESL in the charge image recording medium RM.

In the charge image read head RH, there is provided a read element including, e.g., an optical modulation material layer member PML (e.g., a material layer for optical modulation such as lithium niobate having the electrooptical effect or nematic liquid crystal) exhibiting a characteristic to vary the state of light depending upon an applied voltage, provided on one surface thereof with a dielectric mirror DML and one the other surface with a transparent electrode Etr.

When a charge pattern is exposed to the side of the dielectric mirror DML of the read element, and a light is caused to be incident to the optical modulation material layer member PML through the transparent electrode Etr, that incident light travels through the optical modulation material layer member PML and is then reflected by the dielectric mirror DML. The reflected light travels through the optical modulation material layer member PML again and is then emitted out of the optical modulation material layer member PML through the transparent electrode Etr. The state of the emitted light (angle of the polarized plane of the light) and the state of the incident light (angle of the polarizing surface in the case of the above example) vary in correspondence with a quantity of charges in the charge image, which modulates the property of the optical modulation material layer PML.

A method is employed to pass a light emitted from, e.g., a laser light source 31 (or a light source 31 using a halogen lamp) through a polarizer 32 to change it a linear polarized light beam (there is no need to use polarizer 32 where the light source 31 is a laser light source of linear polarization), thereafter allowing it to be incident to a light deflector 33.

The light deflector 33 applies the light two dimensional deflections so that it is deflected in two directions perpendicular to each other like a raster scan in television receivers.

The light beam emitted from the light deflector 33 is aligned parallel light paths by a collimator lens 34. The resulted quasi parallel light beams are incident to a beam splitter 35.

The light beam incident to the beam splitter 35 is focused by a lens 36, and is then incident to a read element. Since the surface of the dielectric layer member IL in the charge image recording medium RM in which recording information is stored in the form of a charge image is opposing to the dielectric mirror DML side in the read element, the electric field by the charge image recorded at the boundary between the dielectric layer member IL and the charge transfer suppressive layer member ESL is applied to the optical modulation material layer member through the charge transfer suppressive layer member EML the dielectric mirror DML.

Because of the arrangement and processes explained before, a light emitted out from the read element is such that the quantity of rotation of the polarization plane is varied dependent upon a quantity of charges of the charge image recorded in the recording medium RM a quasi-parallel light beams formed by the above-described collimator lens 34.

The above-mentioned emitted light from the read element through the lens 36 is deflected by the beam splitter 35 to the focusing lens 37, the quasi-parallel light beams are converged by the focusing lense 37 to a single point.

By disposing a photoconductive transducer 40 at the single point of which is the focal point of the focusing lens 37, through a wavelength plate 38 for setting an optical bias and an analyzer 39 for converting a quantity of rotation of the polarized plane into an intensity modulated light, a video signal having an amplitude modulated depending upon a quantity of charges at respective portions of the two-dimensional charge image in the charge image recording medium RM, is obtained from the photoconductive transducer 40.

The video signal outputed from the photoconductive transducer 40 as stated above corresponds to a charge quantity distribution in a two-dimensional charge image having a high resolution in the charge image recording medium RM. Thus, when a laser light beam, e.g., having a diameter of 1 micron is used, a video signal corresponding to a high resolution such as 300 lines per milimeters can be produced.

As apparent from the foregoing explanation made with reference to FIG. 57, the reproducing system shown in FIG. 53 using electrostatic read head RH, the reproduction of the information recorded as a charge image in the charge image recording medium RM, is satisfactorily performed as an electric signal generation.

Figure 58:
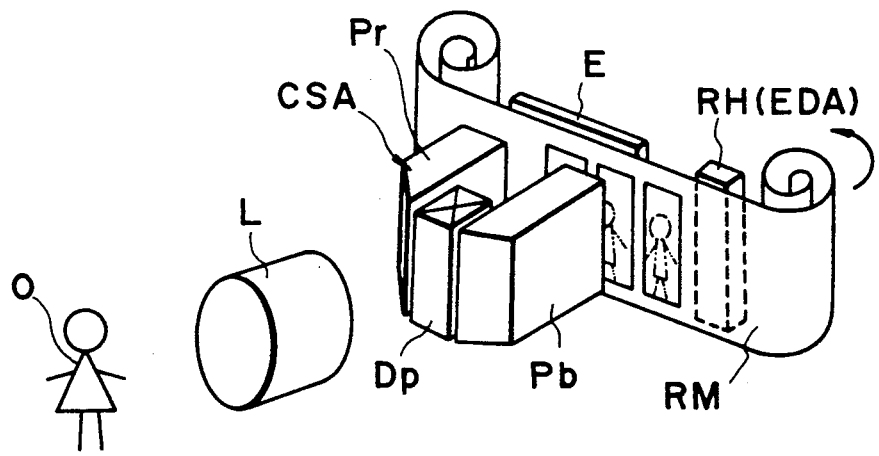
FIG. 58 is a block diagram showing an example of the arrangement of a color image pickup device provided with a three color separation system.
Figure 59:
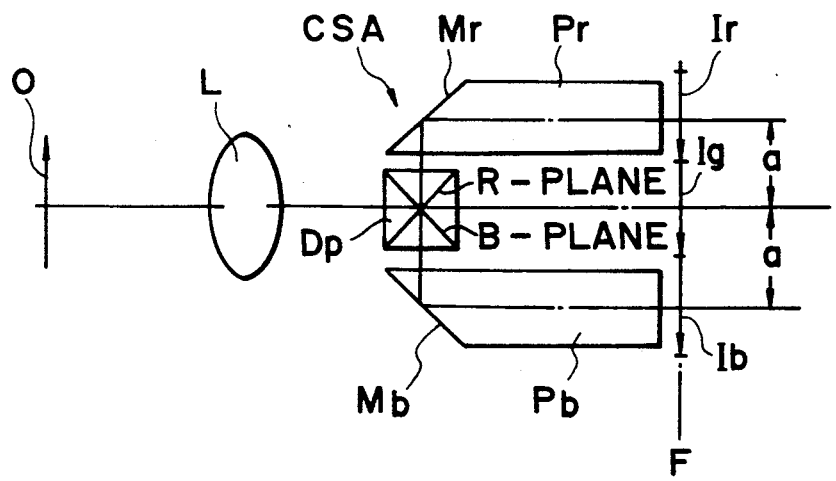
FIG. 59 is a plan view showing an example of the arrangement of a three color separation optical system.
Figure 60:
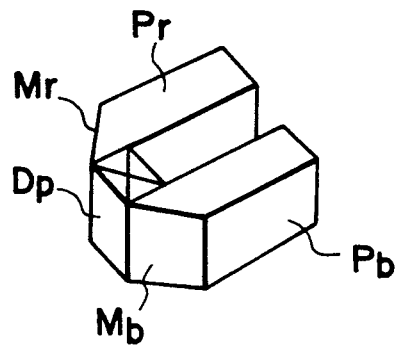
FIG. 60 is a perspective view showing an example of the arrangement of a three color separation optical system.

FIG. 58 is a perspective view showing an example of the arrangement wherein a color image is recorded and reproduced as a group of charge images on and from a recording medium RM. In FIG. 58, 0 represents an object, and the arrangement shown in this figure includes an imaging lens L, a three color separation optical system CSA, a charge image recording medium RM, an electrode E, and a read head RH (EDA).

The actual configuration and functions of the three color separation optical system CSA indicated by CSA are already explained in the foregoing section of the present specification therefore a detailed explanation therefor is omitted.

In the apparatus for recording/reproducing a color pictorial image illustrated in FIG. 58, there is used a three color separation optical system of a structure such that optical images of the object separated into three primary colors are aligned in contiguity with each other within the same plane. Instead of the three color separation optical system shown in the FIG. 58 for recording-/reproducing a color pictorial image, a color separation stripe filter as used in, e.g., a single tube color camera, or a single plate color camera may be used.

For repeatedly carrying out the recording and reproducing operation using the charge image recording medium RM as a recording medium having a reversible property, it is required to erase a charge image recorded as an electrostatic latent image in the charge image recording medium RM.

An erasing method according to this invention for erasing the electrostatic latent image recorded in the charge image recording medium RM will be described with reference to FIGS. 41 to 47. FIGS. 41 to 46 are views for explaining a method of erasing a charge image in the charge image recording medium RM in which information is recorded as a charge image by the recording system shown in FIG. 49, charge image of negative charges are formed at the boundary surface between the dielectric layer member IL and the charge transfer suppressive layer member ESL.

As shown in FIG. 41 a combination of the write head WH and the recording medium RM is brought into a dark room and is connected to an erasing power source Vbe with the positive terminal of which being connected to the transparent electrode Et and the negative terminal to the electrode E.

Figure 47A:
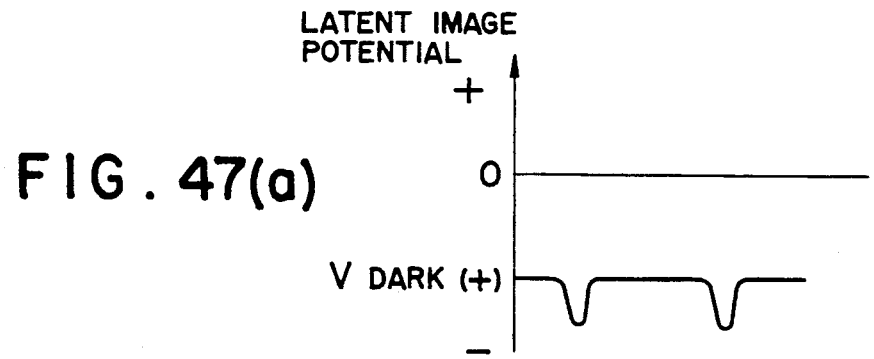
FIG. 47 is a voltage waveform diagram for explaining the method for erasing electrostatic latent image in the charge image recording medium of the invention.
Figure 47B:
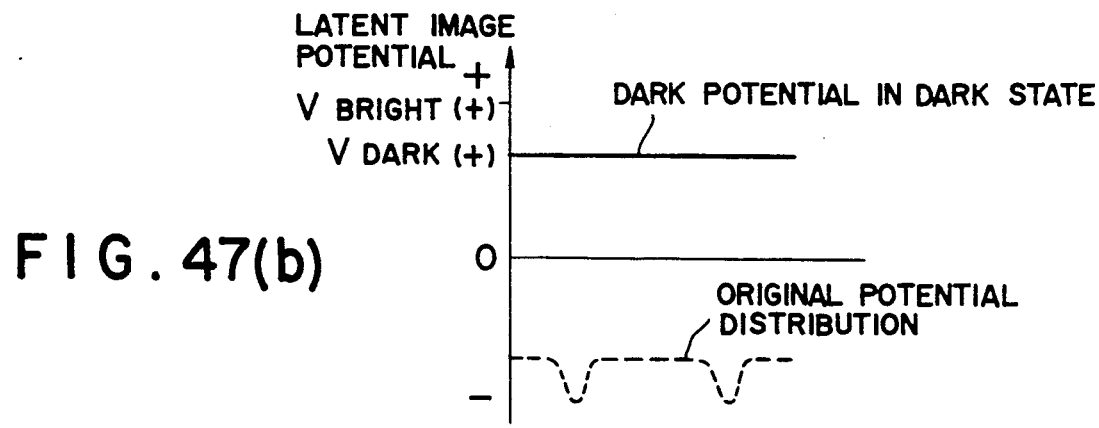
Figure 47C:
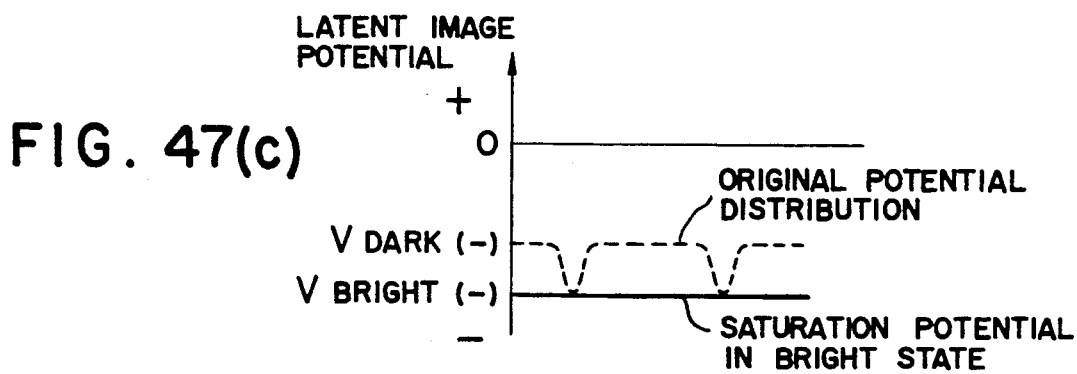

The electrostatic latent image potential by negative charges recorded at the boundary surface between the dielectric layer member IL and the charge transfer suppressive layer member ESL in the charge image recording medium RM shown in FIG. 41 is such that, as shown in FIG. 47(a) the potential of Vdark (−) corresponds to the dark portion of the optical image of the object 0 and the negative peaks going below the Vdark corresponds to the bright portion of the optical image of the object 0.

When the positive terminal of the erasing power source Vbe is connected to the transparent electrode Et in the write head H and the negative electrode of the erasing power source Vbe is connected to the electrode E as shown in FIG. 41 in a dark place, positive charges transfer or move from the surface of the photoconductive layer member PCE in the write head to the charge transfer suppressive layer member ESL of the charge image recording medium RM by an electric field applied across the transparent electrode Et and the electrode E. Thus, negative charges formed at the boundary surface between the dielectric layer member IL and the charge transfer suppressive layer member ESL are neutralized and the boundary surface is accumulated with positive charges indicative of fixed potential as dark potential Vdark (+) in FIG. 47(b). The charge image thereon is thus erased.

Figure 42:
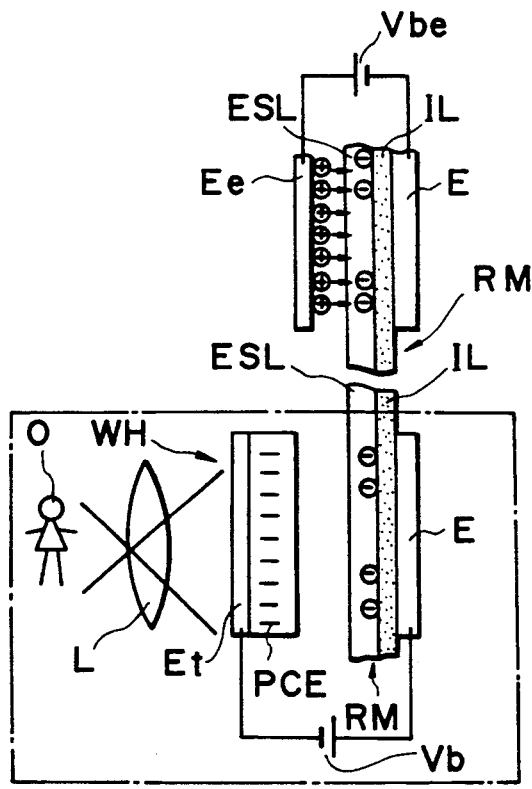

FIG. 42 shows an example of a structure such that the same erasing operation as the erasing operation illustrated in FIG. 41 is carried out at the upper portion of the figure (the portion where erasing electrode Ee, erasing power source Vbe, charge image recording medium RM, and electrode E are shown), and that the same operation for recording information being carried out by a recording system as illustrated in FIG. 49 is the lower portion of the figure.

Figure 43:
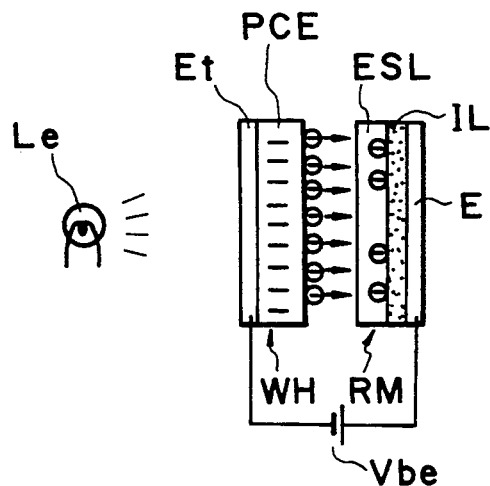

The erasing method illustrated in FIG. 43 will be now described. It is assumed that, in the charge image recording medium RM, an information is recorded as a charge image of negative charges at the boundary surface between the dielectric layer member IL and the charge transfer suppressive layer member SL by the recording system, e.g., as illustrated in FIG. 49.

In FIG. 43, erasing power source Vbe is connected in the same manner as in the recording system shown in FIG. 49, i.e., the negative terminal of the erasing power source Vbe is connected, to the transparent electrode Et and the positive terminal Vbe is connected to the electrode E. A uniform light is irradiated over the whole surface of the write head WH from the erasing light source Le toward the transparent electrode Et of the write head WH.

In the arrangement shown in FIG. 43, since a uniform light is irradiated from the erasing light source Le toward the transparent electrode Et of the write head, the photoconductive layer member PCE of the write head WH becomes low resistance state over the whole surface thereof. As a result, negative charges are discharged from the whole surface of the photoconductive layer member PCE to the whole surface of the charge transfer suppressive layer member ESL of the charge image recording medium RM. Thus, negative charges are appended to the whole surface of the charge transfer suppressive layer member ESL and move into the charge transfer suppressive layer member ESL as a tunnel current by the tunnel effect. Thus, they move up to the boundary surface between the charge transfer suppressive layer member ESL and the dielectric layer member IL, whereby the potential at the boundary surface is saturated with negative charges and shifts from the state of a potential distribution indicated by dotted lines in FIG. 47(c) to the state of a uniform potential (saturation potential indicative of a bright state) as indicated by Vbright (−) in the figure. The erasing operation is thus carried out. However under this condition, it is difficult to conduct a new recording of negative charge image because the boundary is already at a considerably high negative potential.

In the case of recording information to be newly recorded with a negative charge image into the charge image recording medium RM under the above condition it is required to change the boundary condition, to a zero potential or a constant positive potential. In that case, the previously described erasing method as shown in FIG. 41 or an erasing method as shown in FIG. 44 which will be described later may be applied to the charge image recording medium RM which has been erased by the application of the erasing method as shown in FIG. 43.

It is of course quite possible to record a positive charge image onto the charge image recording medium RM in which the boundary is saturated with negative charges due to the application of the erasing method described with reference to FIG. 43.

Figure 44:
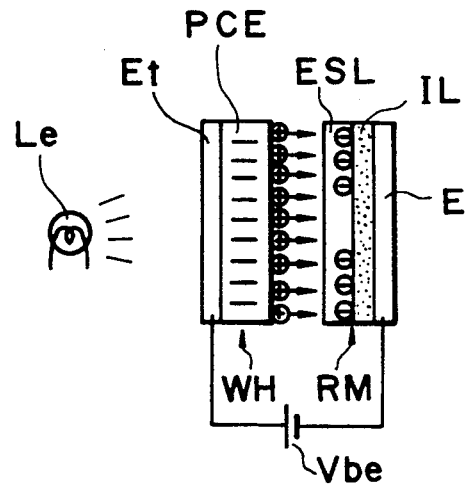

An erasing method illustrated in FIG. 44 will be now described. In the charge image recording medium RM shown in FIG. 44, information subject to recording is recorded as a charge image of negative charges at the boundary surface between the dielectric layer member IL and the charge transfer suppressive layer member ESL by the recording system, e.g., as shown in FIG. 49.

In FIG. 44, erasing power source Vbe connected to the transparent electrode Et in the write head WH and the electrode E has a connection polarity opposite to that of the recording system shown in FIG. 49, i.e., the positive terminal of the erasing power source Vbe is connected to the transparent electrode Et, and the negative terminal of the erasing power source Vbe is connected to the electrode E. A uniform light is irradiated over the whole surface of the write head WH from the erasing light source Le toward the transparent electrode Et in the write head WH.

In the arrangement shown in FIG. 44, since a uniform light is irradiated from the erasing light source Le toward the transparent electrode Et side in the write head WH, the photoconductive layer member PCE in the write head WH becomes a low resistance state over the whole surface thereof. As a result, positive charges are discharged from the whole surface of the photoconductive layer member PCE to the whole surface of the charge transfer suppressive layer member ESL in the charge image recording medium RM.

Figure 47D:
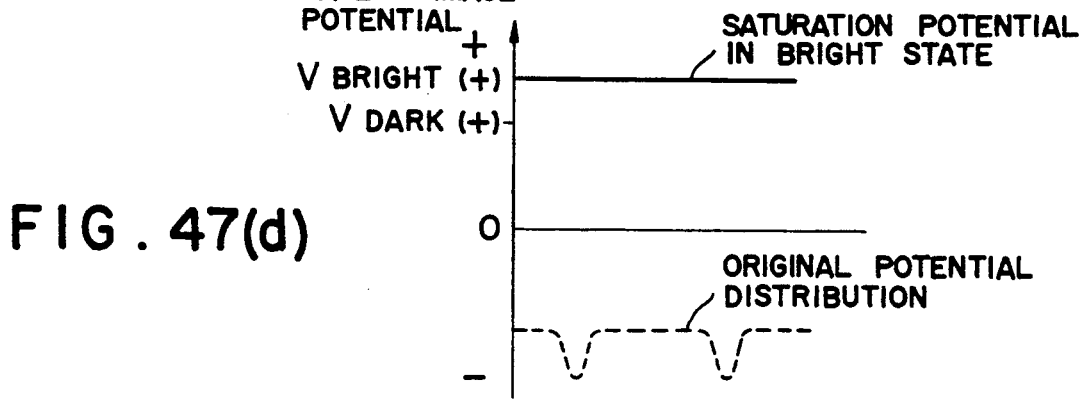

Thus, negative charges recorded at the boundary surface between the dielectric layer member IL and the charge transfer suppressive layer member ESL is neutratized and the potential at the boundary surface is saturated to shift from the state of a potential distribution indicated by dotted lines in FIG. 47(d) to the state of a uniform potential (saturation potential indicative of a bright state) as indicated by Vbright (+) in the figure. The erasing operation is thus carried out.

Figure 46:
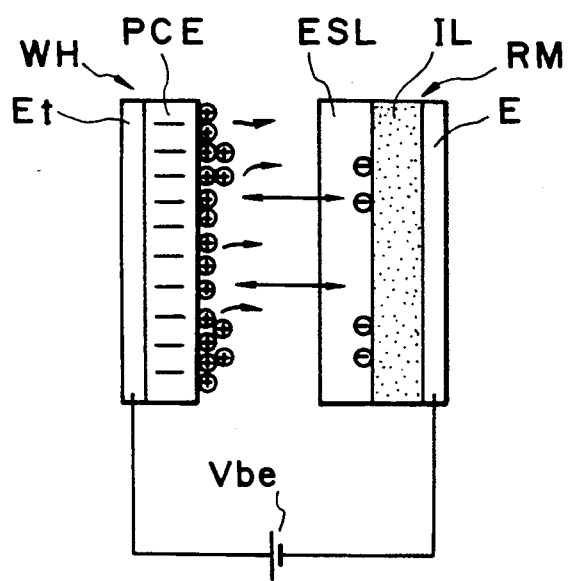
Figure 46:
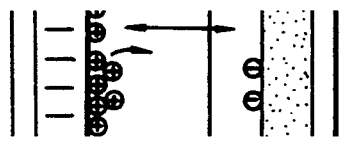

FIG. 46 is an explanatory view of an erasing method in which, as in the erasing methods respectively shown in FIGS. 41, 42 and 44, positive charges are given from the whole surface of the photoconductive layer member PCE to the whole surface of the charge transfer suppressive layer member ESL in the charge image recording medium RM. The positive charges further moves through a body of the charge transfer suppressive layer member ESL by the tunnel effect to neutralize the negative charges on the boundary of the charge image recording medium RM to thereby allow the potential at the boundary surface to shift from the state of a potential distribution indicated by dotted lines in FIG. 47(b) or (d) to the state of a uniform potential (saturation potential indicative of a bright state) as indicated by Vbright (+) in the figure, thus to perform the erasing operation under this condition.

It is illustrated and described in FIG. 46 that positive charges having a quantity corresponding to that of negative charges recorded at the boundary surface between the dielectric layer member IL and the charge transfer suppressive layer member ESL in the charge image recording medium RM are delivered from the write head WH to the charge image recording medium RM, whereby erasing of the charge image in the charge image recording medium RM is satisfactorily carried out.

The reason why positive charges having a quantity corresponding to that of negative charges recorded at the boundary surface move out toward the charge image recording medium RM is that the electric field strength across the space between the photoconductive layer member PCL and the charge transfer suppressive layer member ESL is varied in accordance of the distribution of the negative charges on the boundary surface between the dielectric layer member IL and the charge transfer suppressive layer member ESL.

Figure 45A:
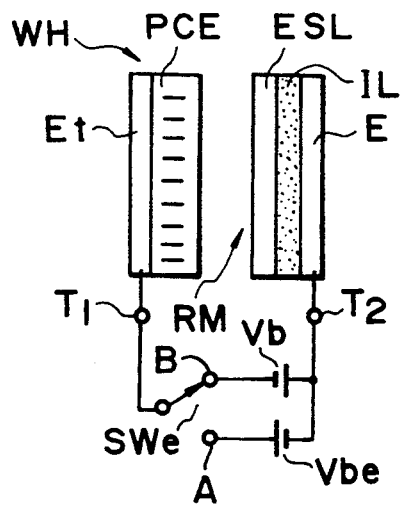

A method of erasing an electrostatic latent image of a charge image recording medium in the case where recording is being applied to the charge image recording medium in the form of an electrostatic latent image will be now described with reference to FIGS. 45(a) and (b). In FIGS. 45(a) and (b), SWe is a changeover switch, T1 and T2 are connection terminals, respectively, and Vb and Vbe are power sources, respectively. In addition, Ee in FIG. 45(b) is an a.c. power source for erasing.

In FIG. 45(a), the negative terminal of the power source Vb is connected to a fixed contact B of the changeover switch SWe of which movable contact is connected to the terminal T1 and to the electrode Et of the charge image recording medium RM, the positive terminal of the erasing power source Vbe is connected to a fixed contact A of the changeover switch SWe.

Both the positive terminal of the power source Vb and the negative terminal of the erasing power source Vbe are connected to the terminal T2 and to the electrode E. At the time of the recording operation, the movable contact of the changeover switch SWe is switched to the fixed contact B. Further, at the time of the erasing operation, the movable contact of the changeover switch SWe is interchangeably switched to either of two fixed contacts A or B thus to carry out the erasing operation.

Figure 45B:
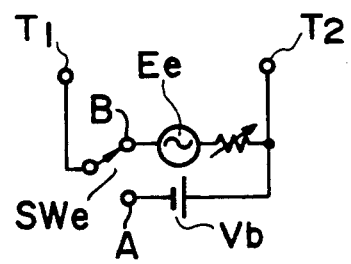

Although an indication of the charge image recording medium RM is omitted in FIG. 45(b), the negative electrode of the power source Vb is connected to a fixed contact A of the changeover switch SWe of which movable contact is connected to the terminal T1 and to the electrode Et of the charge image recording medium RM, one end of the erasing a.c. power source Ee is connected to a fixed contact B of the changeover switch SWe.

Both the positive terminal of the power source Vb and another end of the erasing a.c. power source Ee are connected to the terminal T2 and to the electrode E. At the time of the recording operation, the movable contact of the changeover switch SWe is switched to the fixed contact A to carry out the recording operation. Further, at the time of the erasing operation, the movable contact of the changeover switch SWe is switched to the fixed contact B to carry out the erasing operation.

In the erasing method illustrated in FIGS. 45(a) and (b), at the time of the erasing operation, the strength of an electric field across the transparent electrode Et and the boundary surface between the dielectric layer member IL and the charge transfer suppressive layer member ESL becomes large. As a result, negative charges held at the boundary surface between the dielectric layer member IL and the charge transfer suppressive layer member ESL move within the charge transfer suppressive layer member as a tunnel current by the tunnel effect and further to the transparent electrode Et. The electrostatic latent image of the charge image recording medium RM is thus erased.

It is to be noted that it is effective for satisfactorily erasing the electrostatic latent image that an a.c. voltage from the erasing a.c. power source Ee has an amplitude gradually lowering as the time laps. Further, it is also effective for satisfactorily erasing the electrostatic latent image by applying a polarity of erasing voltage opposite to the polarity applied for recording the electrostatic latent image when the erasing power source is alternate current, application of the a.c. power is cut-off at the moment of polarity which is opposite to the polarity used for recording.

It should be noted that the embodiments of a method of erasing an electrostatic latent image in the charge image recording medium according to this invention, which have been described with reference to FIGS. 41 to 47 are applicable in the same manner, to the erasing of the charge image in the charge image recording medium in which information subject to recording and reproducing is recorded as an electrostatic latent image in the dielectric layer member IL in which at least a layer of fine particles of photoconductor is provided. Accordingly previously mentioned problems encountered with the prior arts are satisfactorily solved by the methods and arrangements according to this invention.

It should be noted that the charge image mentioned in the foregoing is not necessarily a pictorial image, but it can be a frame of charge pattern containing an optical information intended to record and projected to the recording medium for the purpose in a form of either deflected light beam or a single beam of light to form such a frame of charge pattern on the recording medium.

What is claimed is:

1. An image pickup device comprising:
a recording member having a charge transfer suppressive layer member and a dielectric layer member as stacked members having a boundary surface therebetween whereby optical information in the form of an electrostatic charge is repeatedly erased and recorded at the boundary surface;
recording means having a writing head for recording the electrostatic charge image on the recording member by application of an electrical potential between the writing head and the recording member;
erasing means for erasing the electrostatic charge image recorded on the recording member prior to subsequently recording another electrostatic charge image on the recording member by generating and applying an alternating voltage between the writing head and the recording member, the alternating voltage having an amplitude which gradually decreases as time lapses; and
whereby the charge image formed at the boundary surface between the stacked members moves within the charge transfer suppressive layer member as a tunnel current according to a tunnel effect in response to the alternating voltage being applied between the writing head and the recording member of the erasing means, thus being erased.

2. An image pickup device comprising:
a recording member having an electrode which is transparent and a dielectric member formed thereon including at least a layer of fine particles of photoconductive materials, whereby optical information in the form of an electrostatic charge image is repeatedly erased and recorded on the layer of fine particles;
recording means having a writing head for recording the electrostatic charge image on the recording member by application of an electrical potential between the writing head and the recording member; and
erasing means for erasing the electrostatic charge image recorded on the recording member prior to subsequently recording another electrostatic charge image on the recording member by generating and applying an alternating voltage between the writing head and the recording member, the alternating voltage having an amplitude which gradually decreases as time lapses; and
whereby the charge image formed on the layer of the fine particles moves within the dielectric member as a tunnel current according to a tunnel effect in response to the alternating voltage being applied between the writing head and the recording member of the erasing means, thus being erased.

3. An image pickup device comprising:
a recording member having a charge transfer suppressive layer member and a dielectric layer member as stacked members having a boundary surface therebetween whereby optical information in the form of an electrostatic charge image is repeatedly erased and recorded at the boundary surface;
recording means having a writing head for recording the electrostatic charge image on the recording member by application of an electrical potential between the writing head and the recording member;
erasing means for erasing the electrostatic charge image recorded on the recording member prior to subsequently recording another electrostatic charge image on the recording member by generating and applying an alternating voltage between the writing head and the recording member, the alternating voltage being terminated at a moment in which a polarity of the alternating voltage is opposite to the polarity of the electrical potential used for recording the charge image; and
whereby the charge image formed at the boundary surface between the stacked members moves within the charge transfer suppressive layer member as a tunnel current according to a tunnel effect in response to the alternating voltage being applied between the writing head and the recording member, and to the erasing mens, thus being erased.

4. An image pickup device comprising:

a recording member having a charge transfer suppressive layer member and a dielectric layer member as stacked members having a boundary surface therebetween whereby optical information in the form of an electrostatic charge image is repeatedly erased and recorded at the boundary surface;

recording means having a writing head for recording the electrostatic charge image on the recording member by application of a first electrical potential between the writing head and the recording member;

erasing means for erasing the electrostatic charge image recorded on the recording member prior to subsequently recording another electrostatic charge image on the recording member by generating and applying a second electrical potential having a polarity opposite to that of the first electrical potential, between the writing head and the recording member;

whereby the charge image formed at the boundary surface between the stacked members moves within the charge transfer suppressive layer member as a tunnel current according to a tunnel effect in response to the second electrical potential being applied between the writing head and the recording member of the erasing means, thus being erased.

5. An image pickup device comprising:

a recording member having an electrode which is transparent and a dielectric member formed thereon including at least a layer of fine particles of photoconductive materials, whereby optical information in the form of an electrostatic charge image is repeatedly erased and recorded on the layer of the fine particles;

recording means having a writing head for recording the electrostatic charge image on the recording member by application of an electrical potential between the writing head and the recording member;

erasing means for erasing the electrostatic charge image recorded on the recording member prior to subsequently recording another electrostatic charge image on the recording member by generating and applying an alternating voltage between the writing head and the recording member, the alternating voltage being terminated at a moment in which a polarity of the alternating voltage is opposite to the polarity of the electrical potential used for recording the charge image; and whereby the charge image formed on the layer of the fine particles moves within the dielectric member as a tunnel current according to a tunnel effect in response to the alternating voltage being applied between the writing head and the recording member of the erasing means, thus being erased.

6. An image pickup device comprising:

a recording member having a charge transfer suppressive layer member and a dielectric layer member as stacked members having a boundary surface therebetween whereby optical information in the form of an electrostatic charge image is repeatedly erased and recorded at the boundary surface;

recording means having a writing head for recording the electrostatic charge image on the recording member by application of a first electrical potential between the writing head and the recording member;

erasing means for erasing the electrostatic charge image recorded on the recording member prior to subsequently recording another electrostatic charge image on the recording member by generating and applying a second electrical potential having a polarity opposite to that of the first electrical potential between the writing head and the recording member; and whereby the charge image formed on the layer of the fine particles moves within the dielectric member as a tunnel current according to a tunnel effect in response to the second electrical potential being applied between the writing head and the recording member of the erasing means, thus being erased.

* * * * *